United States Patent
Xiao et al.

(10) Patent No.: US 11,518,840 B2
(45) Date of Patent: Dec. 6, 2022

(54) DYNAMIC COVALENT THERMOSET NANOCOMPOSITES AND USES THEREOF

(71) Applicant: THE REGENTS OF THE UNIVERSITY OF COLORADO, Denver, CO (US)

(72) Inventors: Jianliang Xiao, Louisville, CO (US); Wei Zhang, Boulder, CO (US); Zhanan Zou, Boulder, CO (US); Chengpu Zhu, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

(21) Appl. No.: 16/765,748

(22) PCT Filed: Nov. 20, 2018

(86) PCT No.: PCT/US2018/062083
§ 371 (c)(1),
(2) Date: May 20, 2020

(87) PCT Pub. No.: WO2019/100069
PCT Pub. Date: May 23, 2019

(65) Prior Publication Data
US 2020/0291164 A1 Sep. 17, 2020

Related U.S. Application Data

(60) Provisional application No. 62/588,814, filed on Nov. 20, 2017.

(51) Int. Cl.
*H01B 1/22* (2006.01)
*C08G 12/06* (2006.01)
(Continued)

(52) U.S. Cl.
CPC ............... *C08G 12/06* (2013.01); *B29D 7/01* (2013.01); *C08K 3/08* (2013.01); *H01B 1/22* (2013.01);
(Continued)

(58) Field of Classification Search
CPC . H01B 1/22; C09D 5/24; C08G 12/06; C08K 3/08
See application file for complete search history.

(56) References Cited

U.S. PATENT DOCUMENTS 6,783,709 B2 * 8/2004 Harreld ................ C08G 77/452
264/36.1
7,612,152 B2 * 11/2009 Braun ..................... B29C 73/22
525/476
(Continued)

OTHER PUBLICATIONS

Self-repair of structural and functional composites with intrinsically self-healing polymer matricies: A review, Composites Part A 69 (2015) 226-239.*
(Continued)

*Primary Examiner* — Mark Kopec
(74) *Attorney, Agent, or Firm* — Saul Ewing Arnstein & Lehr LLP; Kathryn Doyle; Domingos J. Silva

(57) ABSTRACT

In one aspect, the invention provides a healable, recyclable and malleable e-skin. In certain embodiments, the e-skin comprises sensors that can detect at least one applied stimulus. In other embodiments, the e-skin comprises a dynamic covalent thermo set doped with a nano-particle composition, thereby rendering the doped thermoset conductive. The e-skin of the invention has potential applicability to the fields of robotics, prosthetics, health monitoring, biomedical devices and consumer products.

17 Claims, 19 Drawing Sheets

(51) Int. Cl.
 C08K 3/08 (2006.01)
 B29D 7/01 (2006.01)
 B82Y 30/00 (2011.01)
(52) U.S. Cl.
 CPC ....... B29K 2995/0005 (2013.01); B82Y 30/00 (2013.01); C08K 2003/0806 (2013.01); C08K 2201/001 (2013.01); C08K 2201/011 (2013.01)

(56) References Cited

U.S. PATENT DOCUMENTS

| | | | | |
|---|---|---|---|---|
| 9,453,099 | B2* | 9/2016 | Zhang | C08K 7/06 |
| 9,490,045 | B2* | 11/2016 | Tee | G01L 1/18 |
| 9,757,496 | B2* | 9/2017 | Hur | A61L 27/446 |
| 10,899,908 | B2* | 1/2021 | Yun | H01L 51/0048 |
| 2009/0247694 | A1* | 10/2009 | Kritzer | B29C 73/163 |
| | | | | 524/556 |
| 2015/0259458 | A1* | 9/2015 | Zhang | C08L 61/22 |
| | | | | 524/597 |
| 2016/0049217 | A1 | 2/2016 | Tee et al. | |
| 2016/0136876 | A1 | 5/2016 | Lendlein et al. | |
| 2017/0174842 | A1* | 6/2017 | Wang | C08G 77/455 |
| 2018/0231486 | A1* | 8/2018 | Haick | C08L 75/08 |

OTHER PUBLICATIONS

International Search Report and Written Opinion dated Mar. 14, 2019 for International Appln. No. PCT/US18/62083.
Abraira, et al., "The sensory neurons of touch.", Neuron 79, 2013, 618-639.
Chortos, et al., "Pursuing prosthetic electronic skin.", Nature materials 15, 2016, 937-950.
Cordier, et al., "Self-healing and thermoreversible rubber from supramolecular assembly.", Nature 451, 2008, 977-980.
Ho, et al., "Stretchable and Multimodal All Graphene Electronic Skin.", Advanced materials 28, 2016, 2601.
Jung, et al., "High-performance green flexible electronics based on biodegradable cellulose nanofibril paper.", Nature communications 6, 2015, 7170.
Kim, et al., "Materials and noncoplanar mesh designs for integrated circuits with linear elastic responses to extreme mechanical deformations.", Proceedings of the National Academy of Sciences of the United States of America 105, 2008, 18675-18680.
Kim, et al., "Stretchable and foldable silicon integrated circuits.", Science 320, 2008, 507-511.
Kim, et al., "Stretchable silicon nanoribbon electronics for skin prosthesis.", Nature communications 5, 2014, 5747.
Kim, et al., "Stretchable, curvilinear electronics based on inorganic materials.", Advanced materials 22, 2010, 2108-2124.
Kong, et al., "Nanotube molecular wires as chemical sensors.", Science 287, 2000, 622-625.
Lee, et al., "A transparent bending-insensitive pressure sensor.", Nat Nanotechnol 11, 2016, 472-478.
Li, et al., "A highly stretchable autonomous self-healing elastomer.", Nat Chem 8, 2016, 618-624.
Li, et al., "Polyelectrolyte multilayers impart healability to highly electrically conductive films.", Advanced materials 24, 2012, 4578-4582.

Libanori, et al., "Stretchable heterogeneous composites with extreme mechanical gradients.", Nature communications 3, 2012, 1265.
Liu, et al., "Artificial eye for scotopic vision with bioinspired all-optical photosensitivity enhancer.", Proceedings of the National Academy of Sciences of the United States of America 113, 2016, 3982-3985.
Mohammad, et al., "Nano Silver Diffusion Behaviour on Conductive Polymer During Doping Process for High Voltage Application", Materials Science and Engineering, vol. 206, Abstract, Jun. 2017, pp. 012048.
Oh, et al., "Intrinsically stretchable and healable semiconducting polymer for organic transistors.", Nature 539, 2016, 411-415.
Son, et al., "Multifunctional wearable devices for diagnosis and therapy of movement disorders.", Nat Nanotechnol 9, 2014, 397-404.
Song, et al., "Digital cameras with designs inspired by the arthropod eye.", Nature 497, 2013, 95-99.
Studart, et al., "Biologically inspired dynamic material systems.", Angewandte Chemie 54, 2015, 3400-3416.
Taynton, P., "Development of Poly imine-based Dynamic Covalent Networks: From Malleable Polymers to High-Performance Composites", Thesis submitted to Faculty of the Graduate School of the University of Colorado, 2015, pp. 1-195.
Taynton, et al., "Heat- or Water-Driven Malleability in a Highly Recyclable Covaltn Network Polymer", Advanced Materials, vol. 26, No. 23, Jun. 8, 2014, pp. 3938-3942.
Taynton, et al., "Repairable Woven Carbon Fiber Composites with Full Recyclability Enabled by Malleable Polyimine Networks.", Advanced materials 28, 2016, 2904-2909.
Tee, et al., "An electrically and mechanically self-healing composite with pressure- and flexion-sensitive properties for electronic skin applications.", Nat Nanotechnol 7, 2012, 825-832.
Thostenson, et al., "Carbon nanotube networks: Sensing of distributed strain and damage for life prediction and self healing.", Advanced materials 18, 2006, 2837.
Toohey, et al., "Self-healing materials with microvascular networks.", Nature materials 6, 581-585, 2007, 581-585.
Tripathi, S., et al., "Electrical Conductivity in Polyazomethines: A Novel Mechanism Derived from All Valence MO Calculation and IR Study of Polymer-Dopant Interaction", Journal of Macromolecular Science, Part B: Physics, vol. 50, No. 6, 2011, pp. 1196-1214.
Kim, et al., "Epidermal electronics.", Science 333, doi:10.1126/science.1206157, 2011, 838-843.
Wang, et al., "Self-healing chemistry enables the stable operation of silicon microparticle anodes for high-energy lithium-ion batteries.", Nat Chem 5, 2013, 1042-1048.
Wang, et al., "Stretchable Thin Film Materials: Fabrication, Application, and Mechanics.", Journal of Electronic Packaging, 2016, 138.
Wang, et al., "User-interactive electronic skin for instantaneous pressure visualization.", Nature materials 12, 2013, 399-904.
Xu, et al., "Soft microfluidic assemblies of sensors, circuits, and radios for the skin.", Science 344, 2014, 70-74.
Zou, et al., "Rehealable, fully recyclable, and malleable electronic skin enabled by dynamic covalent thermoset nanocomposite", Science Advances, vol. 4, No. 2, Feb. 9, 2018, pp. 1-7.

* cited by examiner

FIG. 2B  FIG. 2C  FIG. 2D
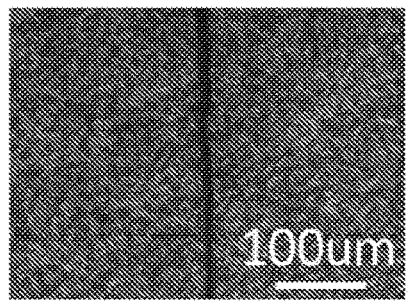
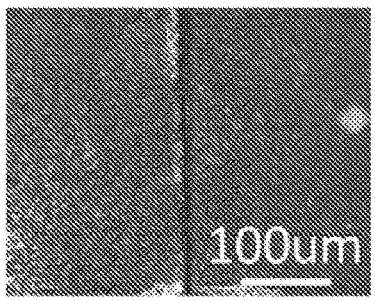
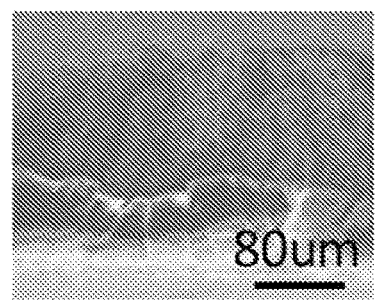
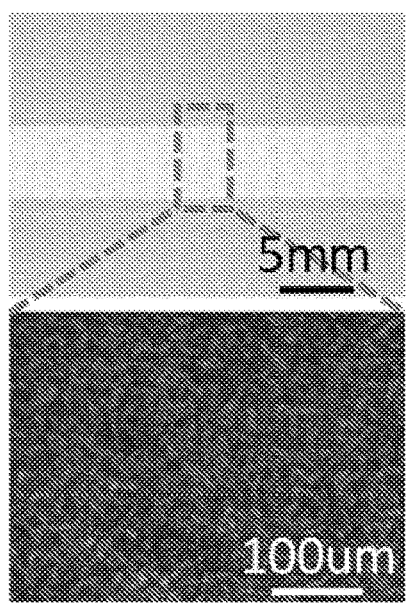
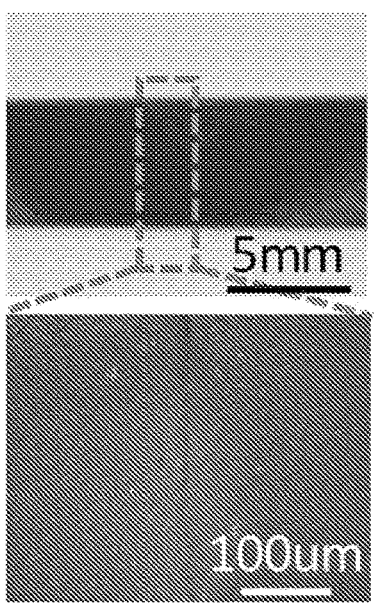
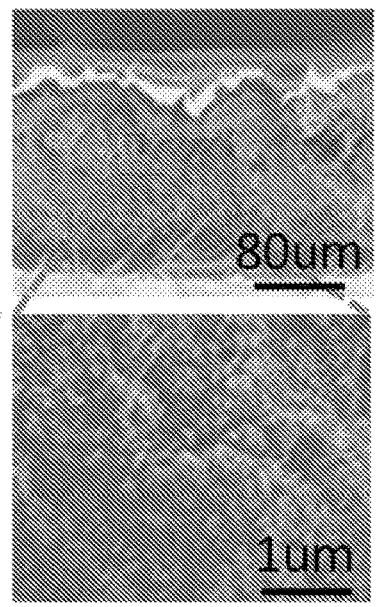
FIG. 2E
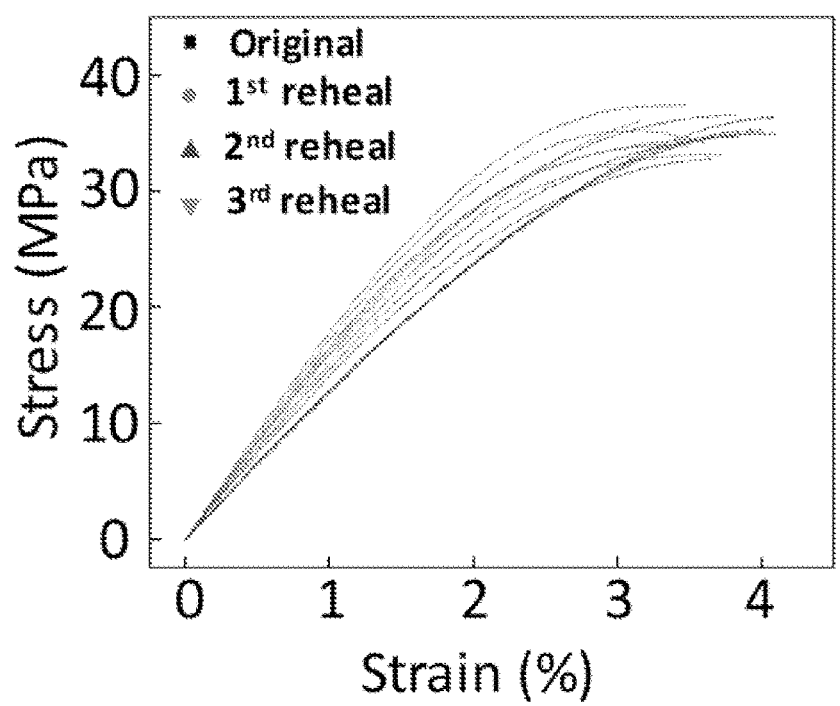

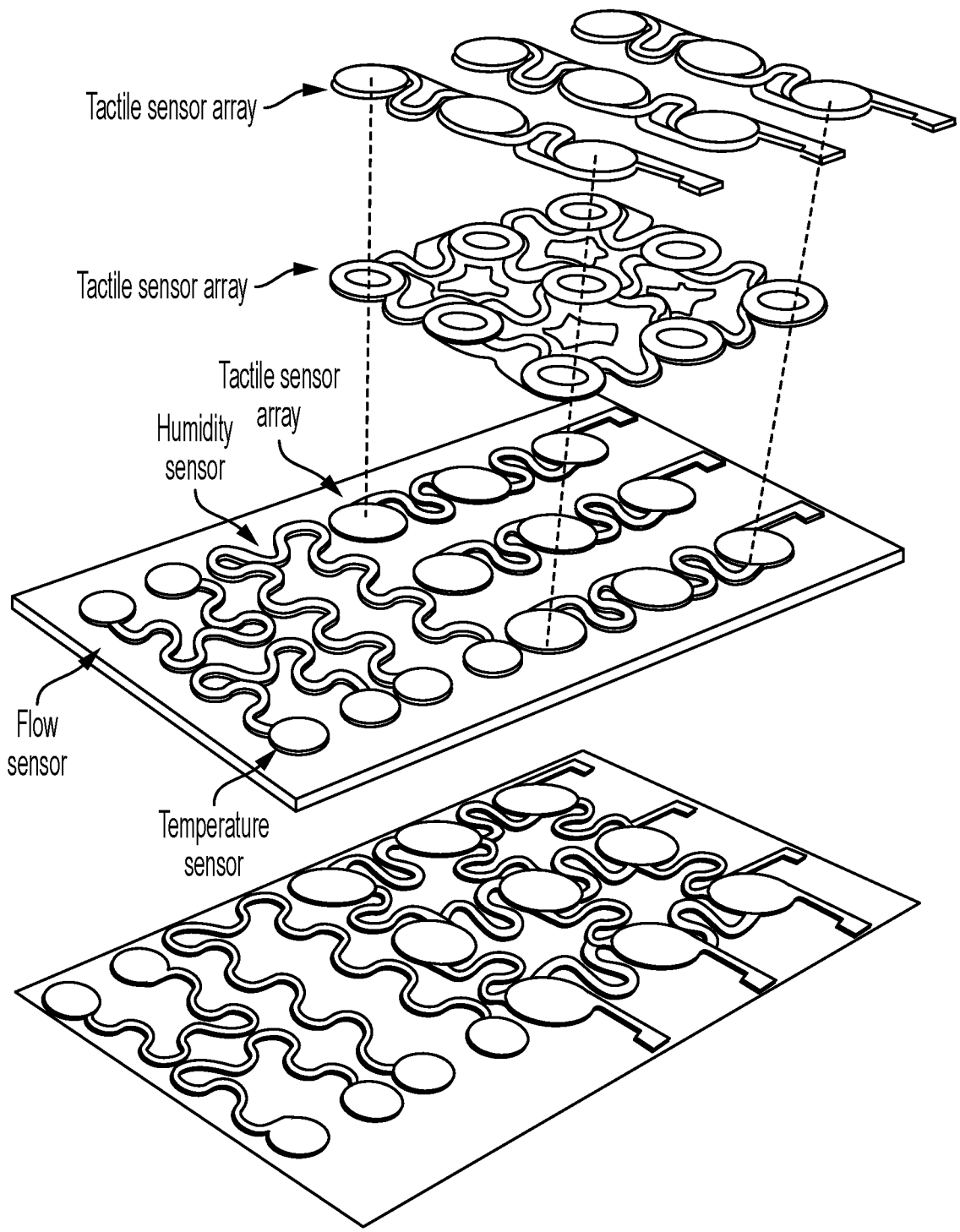

DYNAMIC COVALENT THERMOSET NANOCOMPOSITES AND USES THEREOF

CROSS-REFERENCE TO RELATED APPLICATIONS

The present application is a 35 U.S.C. § 371 national phase application from, and claims priority to, International Application No. PCT/US2018/062083, filed Nov. 20, 2018, which claims priority under 35 U.S.C. § 119(e) to U.S. Provisional Application No. 62/588,814, filed Nov. 20, 2017, all of which applications are incorporated by reference herein in their entireties.

STATEMENT REGARDING FEDERALLY SPONSORED RESEARCH OR DEVELOPMENT

This invention was made with government support under grant number CMMI-1405355 awarded by the National Science Foundation. The government has certain rights in the invention.

BACKGROUND OF THE INVENTION

Skin plays an important role in a person's daily interaction with the environment, both as a protector for internal organs and tissues and as a means for sensing temperature, pressure vibration and haptics. There has been great interest in designing and fabricating electronic skins (e-skins) with functionalities and mechanical properties comparable to natural skin, for potential use in robotics, prosthetics, healthcare and human-computer interfacing. A range of sensing capabilities have been integrated into e-skins including tactile/pressure, temperature, strain, humidity and chemical sensing. Additionally, self-healing e-skins have also been developed.

However, currently available re-healable e-skins do not have sufficient mechanical strength or chemical and thermal stability for many practical applications. Additionally, to date, there have been no reports of e-skins that are fully recyclable, reprocessable and reshapable.

Thus, there is a need in the art for novel e-skin formulations and designs that can be reprocessed and recycled, are self-healing and that integrate an array of sensing capabilities. The present invention meets and addresses these needs.

BRIEF SUMMARY OF THE INVENTION

The invention provides an electrically conductive dynamic covalent network polymer composition. the invention further provides an electronic skin mimic device.

In certain embodiments, the composition comprises at least one dynamic covalent network polymer comprising at least one exchangeable dynamic covalent linkage selected from the group consisting of a disulfide linkage, an imine linkage, a thioester linkage, an acyl hydrazine linkage, a boronic ester linkage, an alkene linkage, an alkyne linkage, an ester linkage, a carbamate linkage and a urea linkage. In other embodiments, the composition comprises at least one electrically conductive particle.

In certain embodiments, the at least one electrically conductive particle is selected from the group consisting of nanoparticles, microparticles, nanowires, nanotubes, and nanoplatelets, wherein the particle comprises at least one material selected from the group consisting of metal, liquid metal, metal oxide, metalloid, and carbon.

In certain embodiments, the at least one electrically conductive particle is selected from the group consisting of carbon black nanoparticles, carbon nanotubes, fullerenes, carbon nanowires, graphite nanoparticles, graphene nanoplatelets, silver nanoparticles, silver nanowires, copper nanoparticles, gold nanoparticles, nickel nanoparticles, boron nanoparticles, and antimony tin oxide nanoparticles.

In certain embodiments, the at least one dynamic covalent network polymer is a polyimine polymer comprising exchangeable imine linkages. In certain embodiments, the dynamic covalent network polymer comprises at least one multifunctional amine monomer, and at least one multifunctional aldehyde monomer.

In certain embodiments, wherein the at least one multifunctional amine monomer is at least one compound selected from the group consisting of a compound of Formula (I), a compound Formula (II) and a salt or solvate thereof:

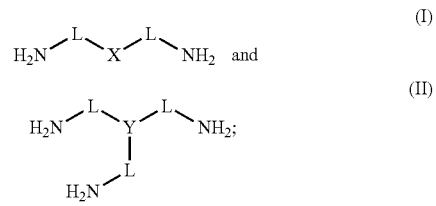

wherein in (I) and (II): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic and a bond; X is selected from the group consisting of phenylene, $CH_2$ and NH; Y is selected from the group consisting of tri-substituted phenyl, CH and N.

In certain embodiments, the compound of formula (I) is

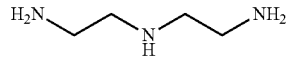

diethylenetriamine.

In certain embodiments, the compound of formula (II) is

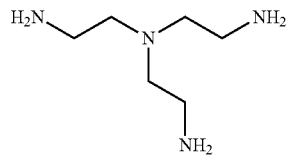

tris(2-aminoethyl)amine.

In certain embodiments, the at least one multifunctional aldehyde monomer is at least one compound selected from the group consisting of a compound of Formula (III), a compound Formula (IV) and a salt or solvate thereof:

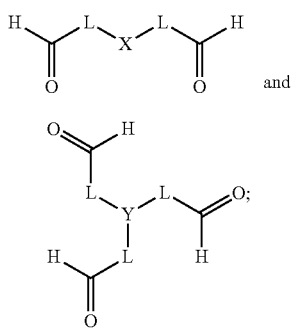

(III)

and (IV)

wherein in (III) or (IV): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic and a bond; X is selected from the group consisting of phenylene, $CH_2$ and NH; Y is selected from the group consisting of tri-substituted phenyl, CH and N.

In certain embodiments, the at least one multifunctional aldehyde monomer is at least one compound selected from the group consisting a compound of Formula (IIIa), a compound Formula (IVa) and a salt or solvate thereof:

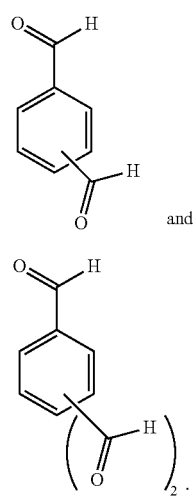

(IIIa)

and (IVa)

In certain embodiments, the at least one multifunctional aldehyde monomer is

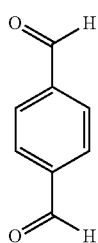

terephthalaldehyde.

In certain embodiments, the composition comprises a dynamic covalent network polymer formed from terephthalaldehyde, diethylenetriamine and tris(2-aminoethyl)amine monomers, and silver nanoparticles. In certain embodiments, the dynamic covalent network polymer comprises terephthalaldehyde, diethylenetriamine, and tris(2-aminoethyl)amine in a ratio of about 13:4:6 (mol:mol:mol).

In certain embodiments, the composition comprises about 15% to about 60% silver nanoparticles by weight. In certain embodiments, the composition comprises about 20% to about 50% silver nanoparticles by weight. In certain embodiments, the composition has a resistance of about 25Ω to about 1Ω.

In certain embodiments, the device comprises at least one electrically conductive dynamic covalent network polymer composition. In certain embodiments, the device comprises at least one non-conductive polymer substrate.

In certain embodiments, at least one electrically conductive dynamic covalent network polymer composition is a composition of the invention.

In certain embodiments, the at least one non-conductive polymer substrate comprises a non-conductive dynamic covalent network polymer comprising at least one exchangeable dynamic covalent linkage selected from the group consisting of a disulfide linkage, an imine linkage, a thioester linkage, an acyl hydrazine linkage, a boronic ester linkage, an alkene linkage, an alkyne linkage, an ester linkage, a carbamate linkage and a urea linkage.

In certain embodiments, the at least one non-conductive dynamic covalent network polymer substrate is a polyimine polymer comprising exchangeable imine linkages.

In certain embodiments, the non-conductive dynamic covalent network polymer substrate comprises at least one multifunctional amine monomer and at least one multifunctional aldehyde monomer.

In certain embodiments, the at least one multifunctional amine monomer is at least one compound selected from the group consisting of a compound of Formula (I), a compound Formula (II) and a salt or solvate thereof:

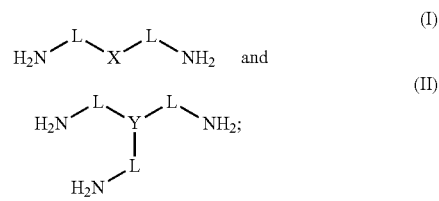

(I)

and (II)

wherein in (I) and (II): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic and a bond; and X is selected from the group consisting of phenylene, $CH_2$ and NH; Y is selected from the group consisting of tri-substituted phenyl, CH and N.

In certain embodiments, the compound of formula (I) is

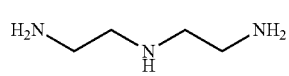

diethylenetriamine. In certain embodiments, the compound of formula (II) is

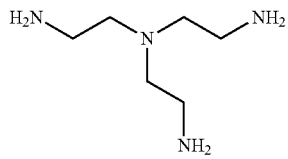

tris(2-aminoethyl)amine.

In certain embodiments, the at least one multifunctional aldehyde monomer is at least one compound selected from the group consisting of a compound of Formula (III), a compound Formula (IV) and a salt or solvate thereof:

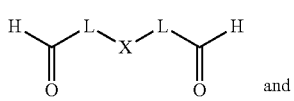

(III) and

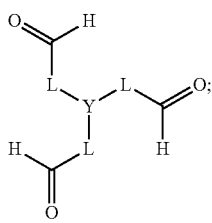

(IV)

wherein in (III) or (IV): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic and a bond; X is selected from the group consisting of phenylene, $CH_2$ and NH; Y is selected from the group consisting of tri-substituted phenyl, CH and N.

In certain embodiments, the at least one multifunctional aldehyde monomer is at least one compound selected from the group consisting a compound of Formula (IIIa), a compound Formula (IVa) and a salt or solvate thereof:

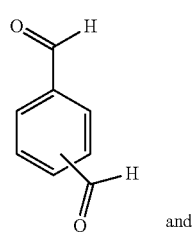

(IIIa) and

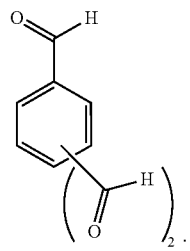

(IVa)

In certain embodiments, the at least one multifunctional aldehyde monomer is

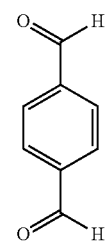

terephthalaldehyde.

In certain embodiments, the non-conductive polymer substrate comprises terephthalaldehyde, diethylenetriamine, and tris(2-aminoethyl)amine.

In certain embodiments, the at least one layer of electrically conductive dynamic covalent network polymer composition has a thickness of about 1 µm to about 1 mm. In certain embodiments, the at least one layer of non-conductive polymer substrate has a thickness of about 0.1 µm to about 1 mm.

In certain embodiments, the device comprises at least one layer of electrically conductive dynamic covalent network polymer composition disposed on the surface of at least one layer of non-conductive polymer substrate.

In certain embodiments, the device comprises at least one serpentine shaped layer of electrically conductive dynamic covalent network polymer composition disposed on the surface of at least one layer of non-conductive polymer substrate. In certain embodiments, the device comprises two or more serpentine shaped layers of electrically conductive dynamic covalent network polymer composition disposed on the surface of at least one layer of non-conductive polymer substrate.

In certain embodiments, the device comprises a sensor. In certain embodiments, the device comprises a sensor capable of detecting or quantifying at least one stimulus selected from the group consisting temperature, fluid flow rate, humidity, air pressure, tactile pressure, force, strain and magnetic field. In certain embodiments, the device comprises a tactile pressure sensor comprising three layers: a first serpentine electrically conductive dynamic covalent network polymer layer array disposed on the surface of the non-conductive polymer substrate, a non-conductive dynamic covalent network polymer layer array of dielectric rings disposed on the first serpentine electrically conductive dynamic covalent network polymer layer array; and a second serpentine electrically conductive dynamic covalent network polymer layer array disposed on the surface of the non-conductive dynamic covalent network polymer layer array of dielectric rings, such that the first electrically conductive array is oriented at a 90° angle in relation to the second electrically conductive array.

In certain embodiments, the non-conductive dynamic covalent network polymer layer array of dielectric rings has a thickness of about 0.1 µm to about 1 mm.

In certain embodiments, the device comprises an array of tactile pressure sensors adapted and configured to distinguish surface textures and shapes.

BRIEF DESCRIPTION OF THE DRAWINGS

The following detailed description of specific embodiments of the invention will be better understood when read in conjunction with the appended drawings. For the purpose of illustrating the invention, specific embodiments are shown in the drawings. It should be understood, however, that the invention is not limited to the precise arrangements and instrumentalities of the embodiments shown in the drawings.

FIG. 1A is a schematic illustration of rehealability and full recyclability of the e-skin. FIG. 1B is a set of images showing that the malleable e-skin can be conformally mounted onto a human's arm (left). When mechanically cut broken (middle), the e-skin can be rehealed by applying a small amount of rehealing agent and heat pressing (right). FIG. 1C is a set of images showing that the e-skin can be fully recycled using the recycling solution (left), yielding the solution with dissolved oligomers/monomers and AgNPs at the bottom (middle). The solution and AgNPs can be reused to make a new e-skin (right).

FIGS. 2A-2G are images and graphs showing the rehealing and characterization of the pure and conductive polyimine films of the invention. FIG. 2A is a schematic illustration of the rehealing process. Optical images of the polyimine film are shown at the bottom of each frame. FIG. 2B is a set of optical microscopy images of a pure polyimine film that is cut, broken (top) and rehealed (bottom). After rehealing, the cut is invisible (middle and bottom). FIG. 2C is a set of optical microscopy images of a conductive polyimine film that is cut, broken (top) and rehealed (bottom). After rehealing, the cut is invisible (middle), but traces of the cut can still be seen under microscope (bottom). FIG. 2D is a set of scanning electron microscopy images of the cross sections of a conductive polyimine film before (top) and after rehealing (middle). The magnified view at the bottom shows the dispersion of AgNPs in the polymer network. FIGS. 2E-2F are graphs showing uniaxial tension test results of pure (FIG. 2E) and conductive (FIG. 2F) polyimine films before and after rehealing. Three samples were tested for each case. FIG. 2G is a graph of electrical resistivity measurements of the conductive polyimine films with varying AgNP weight ratios before and after rehealing.

FIG. 3A is a schematic illustration of the recycling process. FIG. 3B is a set of photographs showing a LED light that is "on" when a conductive polyimine film is connected into a simple lighting circuit (top left). After recycling, the LED light turns off (top right). The recycled solution is then casted into a new, square petri dish (bottom right). After polymerization, the film is conductive and the LED light turns on (bottom left). FIGS. 3C-3D are graphs showing uniaxial tension test results of the pure (FIG. 3C) and conductive (FIG. 3D) polyimine films before and after recycling. FIG. 3E is a graph of electrical resistivity measurements of the conductive polyimine films before and after recycling.

FIGS. 4A-4O are schematics, photographs and graphs showing the characterization of the rehealable, fully recyclable and malleable e-skin of the invention. FIG. 4A is a schematic illustration of the design of the e-skin (top). An optical image of the e-skin is shown at the bottom. FIGS. 4M-4O are graphs showing characterizations of temperature sensor (FIG. 4M), humidity sensor (FIG. 4N) and tactile sensor (FIG. 4O) under bending, and comparison to the flat state.

DETAILED DESCRIPTION OF THE INVENTION

Figure 1A:
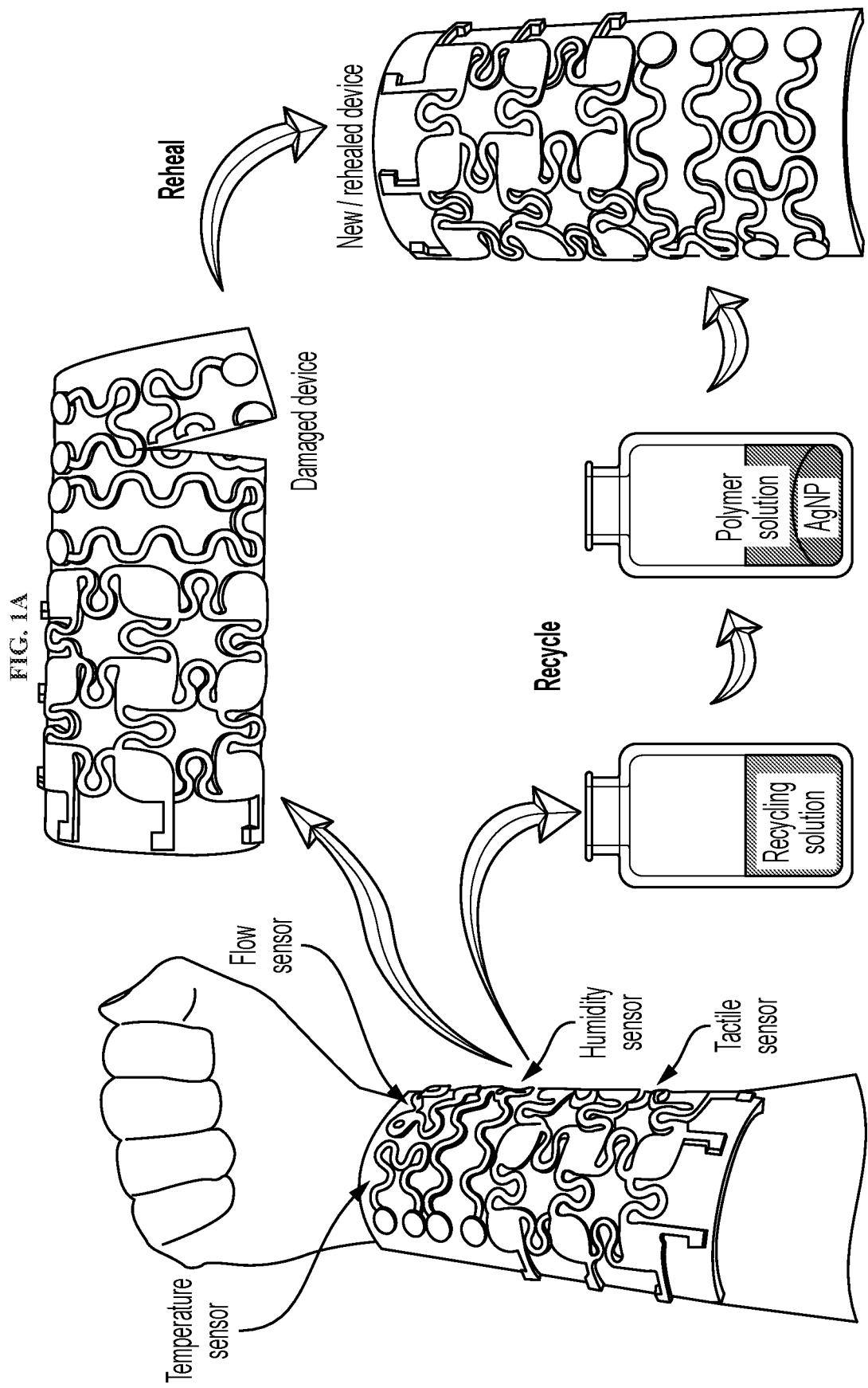
FIGS. 1A-1C are images showing rehealable, fully recyclable and malleable electronic skin (e-skin) of the invention.

In one aspect, the invention provides a healable, recyclable and malleable e-skin. In certain embodiments, the e-skin comprises sensors that can detect at least one applied stimulus. In other embodiments, the e-skin comprises a dynamic covalent thermoset doped with a nano-particle composition, thereby rendering the doped thermoset conductive. In non-limiting embodiments, the e-skin of the invention has potential applicability to the fields of robotics, prosthetics, health monitoring, biomedical devices and consumer products.

Definitions

As used herein, each of the following terms has the meaning associated with it in this section.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

Generally, the nomenclature used herein and the laboratory procedures in polymer chemistry, material science, and electrical engineering are those well-known and commonly employed in the art.

As used herein, the articles "a" and "an" refer to one or to more than one (i.e., to at least one) of the grammatical object of the article. By way of example, "an element" means one element or more than one element.

As used herein, the term "about" is understood by persons of ordinary skill in the art and varies to some extent on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

As used herein, "dynamic covalent polymers" are covalent polymers having covalent linkages that can be reversibly and repeatedly broken and reformed. In certain embodiments, dynamic covalent polymers comprise linkages that are capable of undergoing interchange/bond exchange whereby two or more broken linkages form new covalent bonds with one another such that the original the linkages are not reformed. In non-limiting embodiments, dynamic covalent polymers exhibit self-healing properties and increased material strain relaxation behavior. In certain embodiments, a dynamic covalent polymer can undergo bond exchange when subjected to an external stimulus such as, but not limited to, pressure, heat, photo-irradiation and the addition of a chemical agent such as, but not limited to, a transition metal complex, an acid, a base or water. In certain embodiments, a dynamic covalent polymer can undergo bond exchange at standard ambient conditions or only once a specific external stimulus is applied. The term "dynamic covalent polymers" is commonly understood in the art, as evidenced by Garcia & Smulders, 2016, *Dynamic covalent polymers*, J. Polym. Sci. Part A: Polym. Chem., 54: 3551-3577, which is incorporated herein in its entirety by reference.

As used herein, the term "e-skin" or "electronic skin" refers to an artificial, polymer based skin mimic comprising one or more devices.

The term "monomer" refers to any discreet chemical compound of any molecular weight.

As used herein, the term "polymer" refers to a molecule composed of repeating structural units typically connected by covalent chemical bonds. The term "polymer" is also meant to include the terms copolymer and oligomers. In certain embodiments, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain embodiments, polymerization or crosslinking of at least one functional group results in about 100% consumption of the at least one functional group. In other embodiments, polymerization or crosslinking of at least one functional group results in less than about 100% consumption of the at least one functional group.

As used herein, the term "alkyl", by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$) alkyl, such as, but not limited to, ethyl, methyl, isopropyl, isobutyl, n-pentyl, n-hexyl and cyclopropylmethyl.

As used herein, the term "cycloalkyl", by itself or as part of another substituent means, unless otherwise stated, a cyclic chain hydrocarbon having the number of carbon atoms designated (i.e., $C_3$-$C_6$ means a cyclic group comprising a ring group consisting of three to six carbon atoms) and includes straight, branched chain or cyclic substituent groups. Examples include cyclopropyl, cyclobutyl, cyclopentyl, cyclohexyl, cycloheptyl, and cyclooctyl. Most preferred is ($C_3$-$C_6$)cycloalkyl, such as, but not limited to, cyclopropyl, cyclobutyl, cyclopentyl and cyclohexyl.

As used herein, the term "alkenyl", employed alone or in combination with other terms, means, unless otherwise stated, a stable mono-unsaturated or di-unsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkynyl", employed alone or in combination with other terms, means, unless otherwise stated, a stable straight chain or branched chain hydrocarbon group with a triple carbon-carbon bond, having the stated number of carbon atoms. Non-limiting examples include ethynyl and propynyl, and the higher homologs and isomers.

As used herein, the term "alkylene" by itself or as part of another substituent means, unless otherwise stated, a straight or branched hydrocarbon group having the number of carbon atoms designated (i.e., $C_1$-$C_{10}$ means one to ten carbon atoms) and includes straight, branched chain, or cyclic substituent groups, wherein the group has two open valencies. Examples include methylene, 1,2-ethylene, 1,1-ethylene, 1,1-propylene, 1,2-propylene and 1,3-propylene. Heteroalkylene substituents can a group consisting of the stated number of carbon atoms and one or more heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group.

As used herein, the term "alkenylene", employed alone or in combination with other terms, means, unless otherwise stated, a stable mono-unsaturated or di-unsaturated straight chain or branched chain hydrocarbon group having the stated number of carbon atoms wherein the group has two open valencies.

As used herein, the term "alkynylene", employed alone or in combination with other terms, means, unless otherwise stated, a stable straight chain or branched chain hydrocarbon group with a triple carbon-carbon bond, having the stated number of carbon atoms wherein the group has two open valencies.

As used herein, the term "substituted alkyl", "substituted cycloalkyl", "substituted alkenyl", "substituted alkynyl", "substituted alkylene", "substituted alkenylene" or "substituted alkynylene" means alkyl, cycloalkyl, alkenyl, alkynyl, alkylene, alkenylene, alkynylene as defined above, substituted by one, two or three substituents selected from the group consisting of $C_1$-$C_{10}$ alkyl, halogen, =O, —OH, alkoxy, tetrahydro-2-H-pyranyl, —$NH_2$, —$N(CH_3)_2$, (1-methyl-imidazol-2-yl), pyridin-2-yl, pyridin-3-yl, pyridin-4-yl, —C(=O)OH, trifluoromethyl, —C≡N, —C(=O)O($C_1$-$C_4$)alkyl, —C(=O)$NH_2$, —C(=O)NH($C_1$-$C_4$)alkyl, —C(=O)N(($C_1$-$C_4$)alkyl)$_2$, —$SO_2NH_2$, —C(=NH)$NH_2$, and —$NO_2$, preferably containing one or two substituents selected from halogen, —OH, alkoxy, —$NH_2$, trifluoromethyl, —N($CH_3$)$_2$, and —C(=O)OH, more preferably selected from halogen, alkoxy and —OH. Examples of substituted alkyls include, but are not limited to, 2,2-difluoropropyl, 2-carboxycyclopentyl and 3-chloropropyl.

As used herein, the term "alkoxy" employed alone or in combination with other terms means, unless otherwise stated, an alkyl group having the designated number of carbon atoms, as defined above, connected to the rest of the molecule via an oxygen atom, such as, for example, methoxy, ethoxy, 1-propoxy, 2-propoxy (isopropoxy) and the higher homologs and isomers. Preferred are ($C_1$-$C_3$) alkoxy, such as, but not limited to, ethoxy and methoxy.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "heteroalkyl" by itself or in combination with another term means, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —O—$CH_2$—$CH_2$—$CH_3$, —$CH_2$—$CH_2$—$CH_2$—OH, —$CH_2$—$CH_2$—NH—$CH_3$, —$CH_2$—S—$CH_2$—$CH_3$, and —$CH_2CH_2$—S(=O)—$CH_3$. Up to two heteroatoms may be consecutive, such as, for example, —$CH_2$—NH—$OCH_3$, or —$CH_2$—$CH_2$—S—S—$CH_3$.

As used herein, the term "heteroalkenyl" by itself or in combination with another term means, unless otherwise stated, a stable straight or branched chain monounsaturated or di-unsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH=CH—O—$CH_3$, —CH=CH—$CH_2$—OH, —$CH_2$—CH=N—$OCH_3$, —CH=CH—N($CH_3$)—$CH_3$, and —$CH_2$—CH=CH—$CH_2$—SH.

As used herein, the term "aromatic" refers to a carbocycle or heterocycle with one or more polyunsaturated rings and having aromatic character, i.e. having (4n+2) delocalized π (pi) electrons, where n is an integer.

As used herein, the term "aryl", employed alone or in combination with other terms, means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Preferred are phenyl and naphthyl, most preferred is phenyl.

As used herein, the term "heterocycle" or "heterocyclyl" or "heterocyclic" by itself or as part of another substituent means, unless otherwise stated, an unsubstituted or substituted, stable, mono- or multi-cyclic heterocyclic ring system that consists of carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In one embodiment, the heterocycle is a heteroaryl.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl. Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" means that an atom or group of atoms has replaced hydrogen as the substituent attached to another group.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In one embodiment, the substituents vary in number between one and four. In another embodiment, the substituents vary in number between one and three. In yet another embodiment, the substituents vary in number between one and two. In yet another embodiment, the substituents are independently selected from the group consisting of $C_{1-6}$ alkyl, —OH, $C_{1-6}$ alkoxy, halo, amino, acetamido and nitro. As used herein, where a substituent is an alkyl or alkoxy group, the carbon chain may be branched, straight or cyclic, with straight being preferred.

"Instructional material" as that term is used herein includes a publication, a recording, a diagram, or any other medium of expression that can be used to communicate the usefulness of the composition and/or device of the invention in a kit. The instructional material of the kit may, for example, be affixed to a container that contains the device and/or composition of the invention or be shipped together with a container that contains the device and/or composition.

Throughout this disclosure, various aspects of the invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following abbreviations are used herein: AgNPs—silver nanoparticles

Compositions

In one aspect, the invention provides electrically conductive dynamic covalent network polymer compositions. In certain embodiments, the conductive polymer compositions are self-healing, in that they are capable of reforming and reshaping after being cut or otherwise damaged, in such a way that the reformed and reshaped material is approximately indistinguishable from the original material.

In certain embodiments, the compositions comprise a dynamic covalent network polymer and at least one electrically conductive dopant material.

In certain embodiments, the dynamic covalent network polymer comprises at least one exchangeable dynamic covalent linkage selected from the group consisting of a disulfide linkage (1a, 1b), an imine linkage (2a, 2b), a thioester linkage (3a, 3b), an acyl hydrazine linkage (4), a boronic ester linkage/spiroborate linkage (5a, 5b, 5c), an alkene linkage (6), an alkyne linkage (7), an ester linkage (8a, 8b), a carbamate linkage (9a, 9b) and a urea linkage (10a, 10b). Examples of these classes of linkages are shown in Schemes 1a-10b. In other embodiments, the dynamic covalent network polymer comprises at least one exchangeable dynamic covalent linkage known in the art and is not limited to the embodiments disclosed herein.

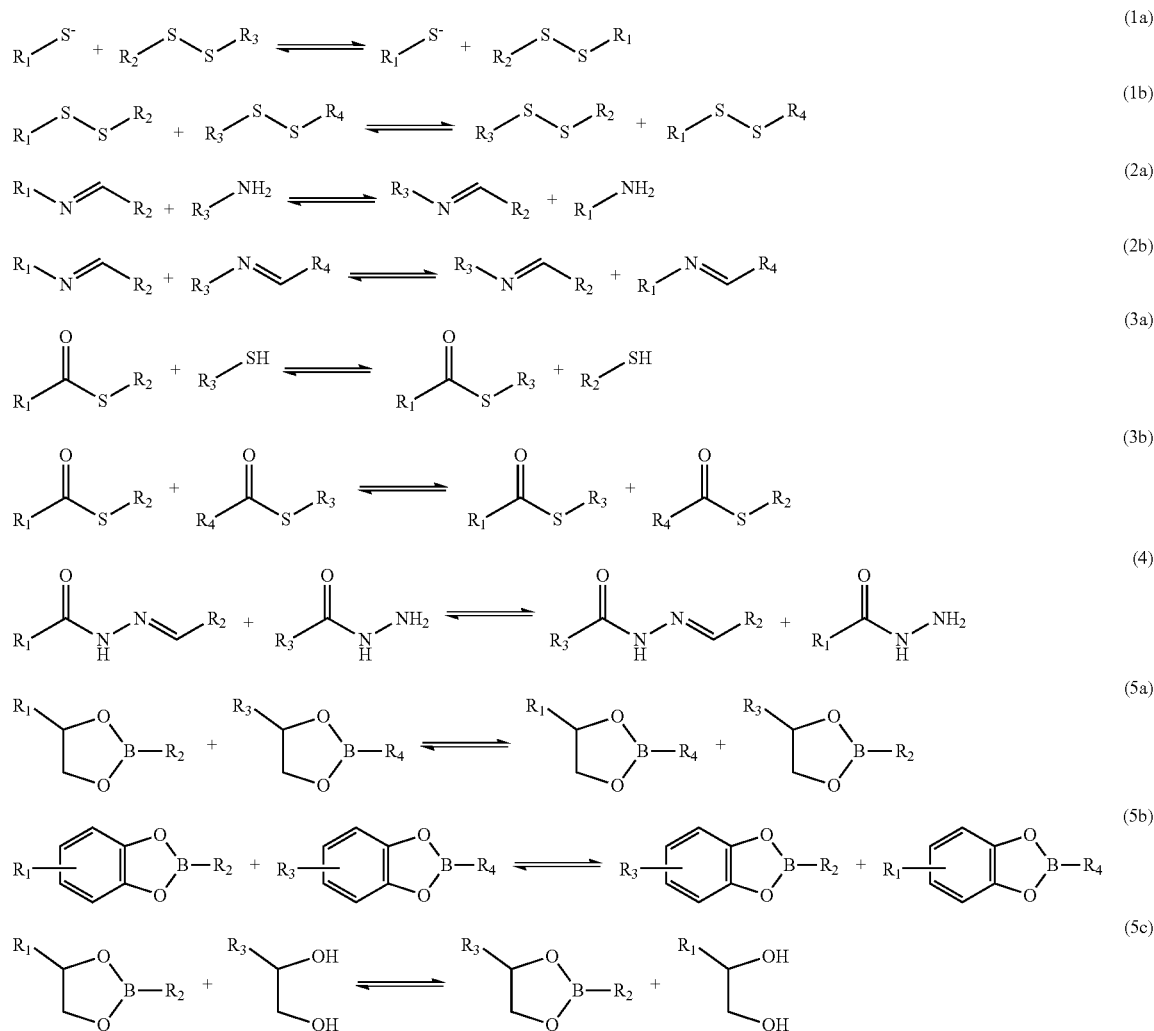

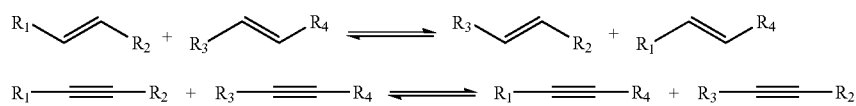
(6)

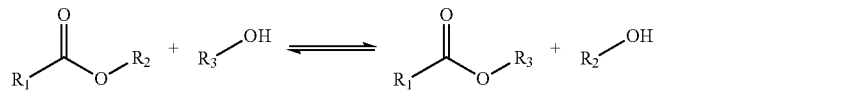
(7)

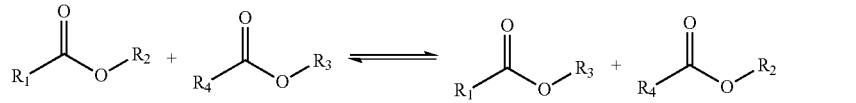
(8a)

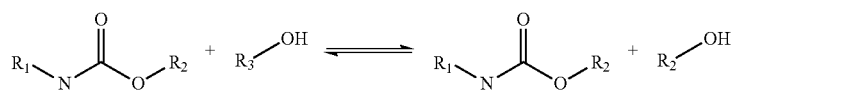
(8b)

(9a)

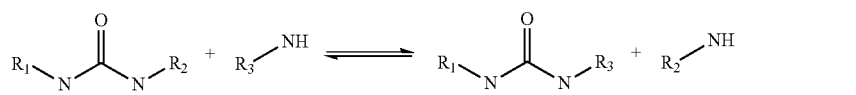
(9b)

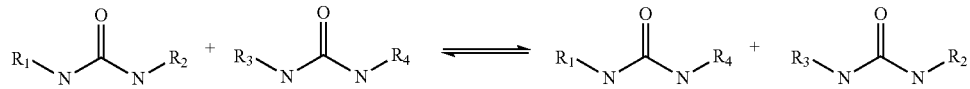
(10a)

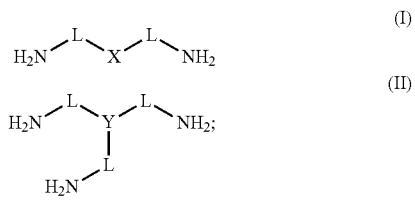
(10b)

In certain embodiments, the dynamic covalent network polymer is a polyimine (also referred to as a poly-Schiff base) dynamic covalent network polymer comprising exchangeable imine linkages.

In certain embodiments, the electrically conductive dopant material is an electrically conductive nanoparticle. In other embodiments, the electrically conductive dopant material is selected from the group consisting of metal nanoparticles and microparticles, metal oxide nanoparticles and microparticles, metalloid nanoparticles and microparticles, and carbon based nanoparticles and microparticles, and liquid metal nanoparticles and microparticles. In yet other embodiments, the electrically conductive dopant material is selected from the group consisting of carbon black nanoparticles, carbon nanotubes, fullerenes, carbon nanowires, graphite nanoparticles, graphene nanoplatelets, silver nanoparticles, silver nanowires, copper nanoparticles, gold nanoparticles, nickel nanoparticles, boron nanoparticles, and antimony tin oxide nanoparticles. In yet other embodiments, the electrically conductive dopant material is any conductive nanoparticle, microparticle, nanowire, nanotube or nanoplatelet known in the art. In yet other embodiments, the liquid metal comprises, for example, mercury, caesium, rubidium, francium, gallium, and/or gallium-based alloys.

In certain embodiments, the composition comprises at least one of the following: at least one multifunctional amine monomer; at least one multifunctional aldehyde monomer; at least one electrically conductive dopant material. In other embodiments, the composition comprises the following: at least one multifunctional amine monomer; at least one multifunctional aldehyde monomer; at least one electrically conductive dopant material.

In certain embodiments, the at least one multifunctional amine monomer is at least one compound selected from the group consisting of a compound of Formula (I), a compound Formula (II) and a salt or solvate thereof:

$$H_2N\overset{L}{\diagup}X\overset{L}{\diagdown}NH_2 \quad (I)$$

$$H_2N\overset{L}{\diagup}Y(\overset{L}{\diagdown}NH_2)\overset{L}{\diagdown}NH_2 \quad (II)$$

wherein in (I) and (II): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic, and a bond; X is selected from the group consisting of phenylene, $CH_2$ and NH; Y is selected from the group consisting of tri-substituted phenyl, CH and N.

In certain embodiments, the compound of formula (I) is

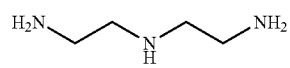

diethylenetriamine.

In certain embodiments, the compound of formula (II) is

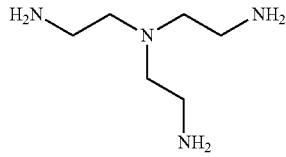

tris(2-aminoethyl)amine.

In certain embodiments, the at least one multifunctional aldehyde monomer is at least one compound selected from the group consisting of a compound of Formula (III), a compound Formula (IV), and a salt or solvate thereof:

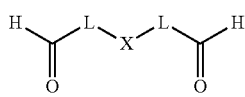
(III)

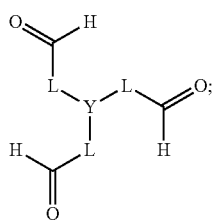
(IV)

wherein in (III) or (IV): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic, and a bond; X is selected from the group consisting of phenylene, $CH_2$ and NH; Y is selected from the group consisting of tri-substituted phenyl, CH and N.

In certain embodiments, the at least one multifunctional aldehyde monomer is at least one compound selected from the group consisting a compound of Formula (IIIa), a compound Formula (IVa), and a salt or solvate thereof:

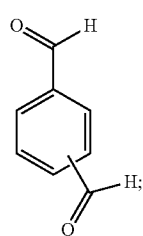
(IIIa)

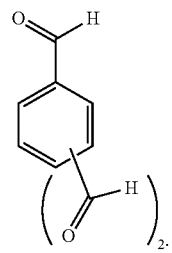
(IVa)

In certain embodiments, the at least one multifunctional aldehyde monomer is

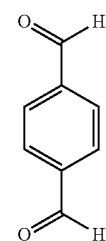

terephthalaldehyde.

In certain embodiments, the composition of the invention comprises terephthalaldehyde, diethylenetriamine, tris(2-aminoethyl)amine, and silver nanoparticles. In other embodiments, the composition comprises terephthalaldehyde, diethylenetriamine, tris(2-aminoethyl)amine in a ratio of about 13:4:6 (mol:mol:mol). In other embodiments, the composition comprises about 15% to about 60% silver nanoparticles by weight. In yet other embodiments, the composition comprises about 20% to about 50% silver nanoparticles by weight.

In certain embodiments, the composition of the invention is conductive. In other embodiments, the composition has a resistance of about 25Ω to about 1Ω.

In certain embodiments, the composition is capable of rehealing, forming a single uninterrupted material after having been previously cut, broken, scratched or otherwise damaged.

In certain embodiments, the composition is capable of being dissolved through the addition of a solvent and an appropriate amount of a multifunctional nucleophilic monomer. In other embodiments, the composition is capable of being reformed after having been dissolved through the addition of an appropriate amount of a multifunctional electrophilic monomer. The ability to dissolve and reform allows the compositions of the invention to be recycled, repaired and remolded. In certain embodiments, the composition is capable of being rehealed, repaired and recycled without a substantial loss of durability, conductivity or resilience. In yet other embodiments, the composition is repaired using a rehealing agent composition comprising at least one compound selected from a multifunctional nucleophilic monomer, a multifunctional electrophilic monomer and any combination thereof. In other embodiments, the rehealing agent composition comprises at least one monomeric compound of the electrically conductive dynamic covalent polymer. In yet other embodiments, the rehealing agent comprises at least one compound of Formulas (I)-(IV). In yet other embodiments, the rehealing agent comprises a solvent. In yet other embodiments, the rehealing agent comprises an ethanol solution comprising terephthalaldehyde, diethylenetriamine, and tris(2-aminoethyl)amine.

In certain embodiments, the composition is capable of being formed into a conductive polymer based device. In other embodiments, the composition can be used as an electrically conducting material as part of a device. In yet other embodiments, the composition can be used as part of an electrical circuit. In yet other embodiments, the composition can be used as an electrical conductor.

Devices

The invention further provides an electronic skin mimic device (e-skin) comprising at least one electrically conductive dynamic covalent network polymer composition and at least one non-conductive polymer substrate.

In certain embodiments, the electrically conductive dynamic covalent network polymer composition is an electrically conductive dynamic covalent network polymer composition of the invention.

In certain embodiments, the non-conductive polymer substrate is any non-conductive polymer known in the art. In other embodiments, the non-conductive polymer substrate is a flexible non-conductive polymer. In yet other embodiments, the non-conductive polymer substrate comprises one or more polymeric materials selected from the group consisting of polydimethylsiloxane, polyimide, polytetrafluoroethylene, polyethylene naphthalate, polyetherimide, polybutyrate, fluorinated ethylene propylene. In other embodiments, the non-conductive polymer substrate is a non-conductive dynamic covalent network polymer.

In other embodiments, the non-conductive dynamic covalent network polymer comprises at least one exchangeable dynamic covalent linkage selected from the group consisting of a disulfide linkage, an imine linkage, a thioester linkage, an acyl hydrazine linkage, a boronic ester linkage/spiroborate linkage, an alkene linkage, an alkyne linkage, an ester linkage, a carbamate linkage and a urea linkage.

In certain embodiments, the non-conductive dynamic covalent network polymer is a polyimine (also referred to as a poly-Schiff base) dynamic covalent network polymer comprising exchangeable imine linkages.

In certain embodiments, the non-conductive substrate comprises: at least one multifunctional amine monomer; and at least one multifunctional aldehyde monomer.

In certain embodiments, the at least one multifunctional amine monomer is at least one compound selected from the group consisting of a compound of Formula (I), a compound Formula (II) and a salt or solvate thereof:

$$H_2N\diagup^L\diagdown X\diagup^L\diagdown NH_2 \quad (I)$$

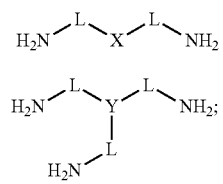
(II)

wherein in (I) or (II): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic, and a bond; X is selected from the group consisting of phenylene, $CH_2$ and NH; Y is selected from the group consisting of tri-substituted phenyl, CH and N.

In certain embodiments, the compound of formula (I) is

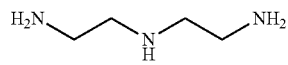

diethylenetriamine.

In certain embodiments, the compound of formula (II) is

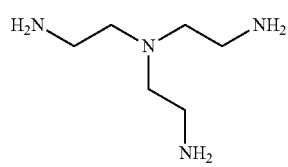

tris(2-aminoethyl)amine.

In certain embodiments, the at least one multifunctional aldehyde monomer is at least one compound selected from the group consisting of a compound of Formula (III), a compound Formula (IV) and a salt or solvate thereof:

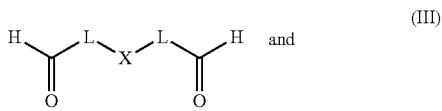

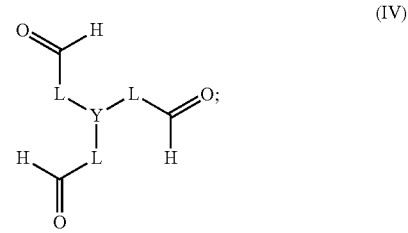

wherein in (III) and (IV): each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic and a bond; X is selected from the group consisting of phenylene, $CH_2$ and NH; Y is selected from the group consisting of tri-substituted phenyl, CH and N.

In certain embodiments, the at least one multifunctional aldehyde monomer is at least one compound selected from the group consisting a compound of Formula (IIIa), a compound Formula (IVa) and a salt or solvate thereof:

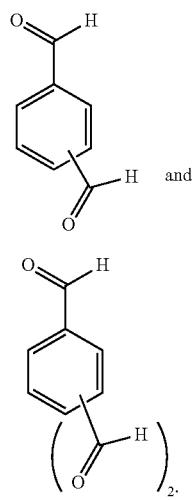

In certain embodiments, the at least one multifunctional aldehyde monomer is

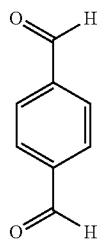

terephthalaldehyde.

In certain embodiments, the non-conductive substrate comprises terephthalaldehyde, diethylenetriamine, and tris (2-aminoethyl)amine.

In certain embodiments, the e-skin device comprises at least one layer of electrically conductive dynamic covalent network polymer composition disposed on the surface of at least one layer of non-conductive polymer substrate. In other embodiments, the e-skin device comprises at least one serpentine shaped layer of electrically conductive dynamic covalent network polymer composition disposed on the surface of at least one layer of non-conductive polymer substrate. In yet other embodiments, e-skin device comprises two or more serpentine shaped layers of electrically conductive dynamic covalent network polymer composition disposed on the surface of at least one layer of non-conductive polymer substrate. In yet other embodiments, the e-skin device comprises a "layer-by-layer" construct comprising alternating layers of electrically conductive dynamic covalent network polymer and non-conductive polymer substrate. In yet other embodiments, the e-skin device comprises alternating layers of electrically conductive dynamic covalent network polymer and non-conductive polymer substrate arranged in concentric layers.

In certain embodiments, the at least one layer of electrically conductive dynamic covalent network polymer is adapted and configured to operate as a sensor. In other embodiments, the at least one layer of electrically conductive dynamic covalent network polymer is adapted and configured to operate as a sensor capable of detecting and/or quantifying at least one stimulus selected from the group consisting temperature, fluid flow rate, humidity, air pressure, tactile pressure, force, strain and magnetic field. In yet other embodiments, e-skin device comprises a high density array of tactile pressure sensors arranged to form a shape sensing array capable of distinguishing surface textures and shapes.

In certain embodiments, the at least one layer of electrically conductive dynamic covalent network polymer composition has a thickness of about 1 μm to about 1 mm. In other embodiments, the at least one layer of non-conductive polymer substrate has a thickness of about 0.1 μm to about 1 mm.

In certain embodiments, the electrically conductive dynamic covalent network polymer is adapted and configured to form a tactile pressure sensor comprising three layers: a first serpentine electrically conductive dynamic covalent network polymer layer array disposed on the surface of the non-conductive polymer substrate, a non-conductive dynamic covalent network polymer layer array of dielectric rings disposed on the first serpentine electrically conductive dynamic covalent network polymer layer array; and a second serpentine electrically conductive dynamic covalent network polymer layer array disposed on the surface of the non-conductive dynamic covalent network polymer layer array of dielectric rings, such that the first electrically conductive array is oriented at a 90° angle in relation to the second electrically conductive array as shown in FIG. 4A. In other embodiments, the non-conductive dynamic covalent network polymer layer array of dielectric rings has a thickness of about 0.1 μm to about 1 mm. In yet other embodiments, the non-conductive dynamic covalent network polymer layer array of dielectric rings comprises at least one material non-conductive dynamic covalent network polymer selected from the group as described elsewhere herein in relation to the non-conductive dynamic covalent network polymer substrate.

In certain embodiments, the device is capable of rehealing, forming a single uninterrupted material after having been previously cut, broken, scratched or otherwise damaged.

In certain embodiments, the device is capable of being dissolved through the addition of a solvent and an appropriate amount of a multifunctional nucleophilic monomer. In other embodiments, the device is capable of being reformed after having been dissolved through the addition of an appropriate amount of a multifunctional electrophilic monomer. The ability to dissolve and reform allows the device of the invention to be recycled, repaired and remolded. In certain embodiments, the device is capable of being rehealed, repaired and recycled without a substantial loss of durability, conductivity or resilience. In yet other embodiments, the composition is repaired using a rehealing agent composition comprising at least one compound selected from a multifunctional nucleophilic monomer, a multifunctional electrophilic monomer and any combination thereof. In other embodiments, the rehealing agent composition comprises at least one monomeric compound of the electrically conductive dynamic covalent polymer. In yet other embodiments, the rehealing agent comprises at least one compound of Formulas (I)-(IV). In yet other embodiments, the rehealing agent comprises a solvent. In yet other embodiments, the rehealing agent comprises an ethanol solution comprising terephthalaldehyde, diethylenetriamine, and tris (2-aminoethyl)amine. In certain embodiments, the e-skin device can be bent or molded into substantially any shape desired without a loss of structural integrity.

In certain embodiments, the invention provides a kit comprising a device of the invention. In other embodiments, the kit further comprises instructional materials for using the device. In yet other embodiments, the kit further comprises a rehealing agent composition as described elsewhere herein.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that, wherever values and ranges are provided herein, the description in range format is merely for convenience and brevity and should not be construed as an inflexible limitation on the scope of the invention. Accordingly, all values and ranges encompassed by these values and ranges are meant to be encompassed within the scope of the present invention. Moreover, all values that fall within these ranges, as well as the upper or lower limits of a range of values, are also contemplated by the present application. The description of a range should be considered to have specifically disclosed all the possible sub-ranges as well as individual numerical values within that range and, when appropriate, partial integers of the numerical values within ranges. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The following examples further illustrate aspects of the present invention. However, they are in no way a limitation of the teachings or disclosure of the present invention as set forth herein.

EXAMPLES

The invention is now described with reference to the following Examples. These Examples are provided for the purpose of illustration only, and the invention is not limited to these Examples, but rather encompasses all variations that are evident as a result of the teachings provided herein.

Materials and Methods

Synthesis of Pure Polyimine Films

A mixture of diethylenetriamine monomer (2, 0.184 g, 1.79 mmol) and tris(2-aminoethyl)amine (3, 0.407 g, 2.78 mmol) was added to a 20 mL screw cap vial followed by addition of ethanol (16 mL) and terephthalaldehyde (1, 0.8 g, 5.96 mmol). The mixture was vigorously stirred till the solution became translucent and yellow-to-orange in color, then the solution was poured into petri dish coated with PDMS. The solution was allowed to evaporate in a fume hood for 12 hours at room temperature followed by heat-pressing at 80° C. and 8.5 kPa.

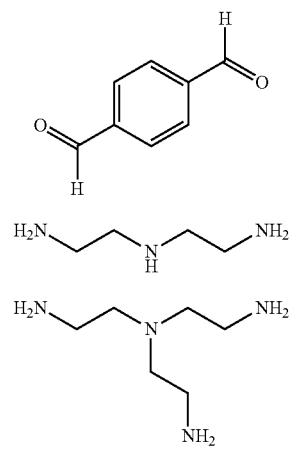

Synthesis and Electrical Resistance of Conductive Polyimine Films

A mixture of diethylenetriamine monomer (2, 0.046 g, 0.448 mmol) and tris(2-aminoethyl)amine (3, 0.102 g, 0.685 mmol) was added to a 5 mL screw cap vial followed by addition of ethanol (4 mL). Silver nanoparticles in different weight percentages (20% wt 0.087 g, 33% wt 0.174 g, 50% wt 0.348 g) were added into the vial and sonicated for 2 hours, then terephthalaldehyde (1, 0.2 g, 1.49 mmol) was added into the vial and the resulting mixture was fully mixed. The mixed solution was then poured into a petri dish coated with PDMS. The solution was allowed to evaporate in a fume hood overnight at room temperature. Three strips (0.12 mm*1.36 mm*30 mm) were cut from the composite film and the resistivity was obtained using four point measurement. The data are shown in Table 1.

TABLE 1

Resistance of the original conductive polyimine films

| AgNPs weight % | Trial No. | Resistance ($\Omega$) | Avg. Resistance ($\Omega$) |
|---|---|---|---|
| 20.0 | 1 | 20.4 | 20.4 |
|  | 2 | 19.3 |  |
|  | 3 | 21.6 |  |
| 33.0 | 1 | 5.90 | 5.90 |
|  | 2 | 6.40 |  |
|  | 3 | 5.30 |  |
| 50.0 | 1 | 1.50 | 1.60 |
|  | 2 | 1.60 |  |
|  | 3 | 1.60 |  |

Reheating of Pure and Conductive Polyimine Films

Both the pure and conductive polyimine film samples were prepared using the formula described above, and cut into dog-bone shapes using laser cutting machine, then uniaxial tension tests were carried out using INSTRON mechanical testing system till the samples broke into two pieces. After the test, the damaged samples were collected for rehealing.

For each pure polyimine sample, the two pieces were firstly aligned together on top of a PDMS sheet. One drop of the rehealing agent (~23 mg of a solution of 1, 0.8 g, 5.96 mmol; 2, 0.184 g, 1.79 mmol; 3, 0.407 g, 2.78 mmol in 16 mL of ethanol) was added on the boundary of the two pieces. After half an hour, the agent rehealed the broken sample. Heat-press (4 h at 80° C. and 8.5 kPa) was adopted to make the rehealed area more uniform and robust. Mechanical tests were carried out to test the rehealed samples. The above processes were repeated three times.

For the conductive polyimine film samples, the processes are the same except for the rehealing agent. AgNPs were added to the agent to ensure 33% weight ratio, and the same processes were carried out for the rehealing of conductive polyimine samples. In addition to the mechanical test, the resistivities before and after rehealing were also measured using four point measurement.

Recycling of Pure and Conductive Polyimine Films

Three pure polyimine film samples were cut out of the film using the laser cutter. Mechanical test was carried out in the same way described above. After the test, all the samples and the residues were collected for recycling. Another 1 equivalent diethylenetriamine (2, 0.046 g, 0.448 mmol), and 1 equivalent tris(2-aminoethyl)amine (3, 0.102 g, 0.685 mmol) were added to dissolve the collected polymer. Then terephthalaldehyde (1, 0.2 g, 1.49 mmol) was added into the solution for re-polymerization. The resulting solution was efficiently mixed and then divided into two equal parts and poured into the PDMS-coated petri dishes. The polymers were allowed to evaporate dry at room temperature for 12 h followed by 4 h heat-press. The recycled polymers were tested to obtain the mechanical properties. The above processes were also repeated three times.

For conductive polyimine films, the recycle processes were mostly the same. When dissolving the collected samples from mechanical testing, sonication was adopted to better dissolve the monomer and oligomer, and to allow AgNPs to disperse in the solution. Extra 0.174 g AgNPs were added to maintain the AgNP weight ratio. Following the same process, mechanical tests were carried out for the conductive polyimine films. Moreover, the electrical resistivities of the conductive polymers before and after recycling were tested, the data are shown in Tables 2, 3 and 4.

TABLE 2

Resistance of the conductive polyimine films after $1^{st}$ recycling

| AgNPs weight % | Trial No. | Resistance (Ω) 1st recycling Sample 1 | Resistance (Ω) 1st recycling Sample 2 | Avg. Resistance (Ω) |
|---|---|---|---|---|
| 20.0 | 1 | 24.7 | 19.2 | 22.5 |
|  | 2 | 27.3 | 18.6 |  |
|  | 3 | 26.1 | 18.9 |  |
| 33.0 | 1 | 8.40 | 6.10 | 7.00 |
|  | 2 | 7.60 | 5.70 |  |
|  | 3 | 7.90 | 6.30 |  |
| 50.0 | 1 | 1.70 | 1.90 | 1.80 |
|  | 2 | 1.60 | 1.80 |  |
|  | 3 | 1.80 | 1.80 |  |

TABLE 3

Resistance of the conductive polyimine films after $2^{nd}$ recycling

| AgNPs weight % | Trial No. | Res.(Ω) 2nd recycling Sample 1 | Res. (Ω) 2nd recycling Sample 2 | Res. (Ω) 2nd recycling Sample 3 | Res. (Ω) 2nd recycling Sample 4 | Avg. Resistance (Ω) |
|---|---|---|---|---|---|---|
| 20.0 | 1 | 18.6 | 21.6 | 35.7 | 24.3 | 20.5 |
|  | 2 | 15.4 | 23.5 | 32.4 | 27.6 |  |
|  | 3 | 17.2 | 26.4 | 33.6 | 26.5 |  |
| 33.0 | 1 | 5.30 | 6.90 | 7.20 | 8.00 | 6.50 |
|  | 2 | 6.20 | 7.30 | 7.90 | 6.90 |  |
|  | 3 | 5.80 | 7.20 | 6.40 | 7.50 |  |
| 50.0 | 1 | 1.40 | 1.40 | 1.80 | 2.00 | 1.50 |
|  | 2 | 1.20 | 1.60 | 1.60 | 2.30 |  |
|  | 3 | 1.50 | 2.00 | 1.60 | 2.10 |  |

TABLE 4

Resistance of the conductive polyimine films after $3^{rd}$ recycling

| AgNPs weight % | Trial No. | Res. (Ω) 3rd recycling Sample 1 | Res. (Ω) 3rd recycling Sample 2 | Res. (Ω) 3rd recycling Sample 3 | Res. (Ω) 3rd recycling Sample 4 | Avg. Resistance (Ω) |
|---|---|---|---|---|---|---|
| 20.0 | 1 | 16.7 | 21.6 | 27.6 | 29.8 | 20.6 |
|  | 2 | 19.8 | 23.5 | 23.5 | 32.3 |  |
|  | 3 | 18.5 | 20.4 | 25.6 | 30.6 |  |
| 33.0 | 1 | 4.90 | 6.40 | 8.00 | 7.60 | 5.80 |
|  | 2 | 5.30 | 6.40 | 7.60 | 7.90 |  |
|  | 3 | 5.50 | 6.40 | 7.60 | 7.10 |  |
| 50.0 | 1 | 1.60 | 1.60 | 1.60 | 2.10 | 1.60 |
|  | 2 | 1.40 | 1.90 | 1.60 | 2.90 |  |
|  | 3 | 1.40 | 1.80 | 1.60 | 2.40 |  |

Mechanical Characterization

Both pure and conductive polyimine films were tested using an INSTRON mechanical testing system. Uniaxial tension load with loading speed of 1 mm/min was used for static tension test. The testing samples were prepared in the shape of dog bones (0.12 mm*1.36 mm*30 mm), by cutting polymer sheets with a laser cutter (Lide laser cutting machine).

Fabrication of Sensors

The sensors were fabricated from the conductive polyimine sheets with 33% AgNP weight ratio. A laser cutter was used to cut the serpentine structures out of the sheets.

The flow sensor, humidity sensor and temperature sensor were designed with serpentine structures to minimize the influence of strains due to the deformation of the whole device. When the sensors were fabricated, silver conductive adhesive was used to connect them to the external conductive wires for measurement. To test the flow sensor, it was attached on the inner wall of a tube of diameter 10 mm, with water flow controlled by a valve. The temperature sensor was characterized in water bath to better control the temperature. To seal both flow and temperature sensors, Kapton tapes were used for encapsulation.

To fabricate the tactile sensor array, two arrays of conductive elements interconnected by serpentines were fabricated from conductive polyimine sheets, as shown in FIG. 4A. An array of dielectric rings of thickness 20 μm was cut from a pure polyimine sheet, as shown in FIG. 4A. The dielectric ring array was sandwiched between the two conductive element arrays, and good alignment was ensured. Then heat-pressing for 10 minutes (1 kPa and 80° C.) bonded the three layers together due to dynamic covalent bond exchange reactions at the interfaces.

Characterization of Sensors

To characterize the temperature and flow sensors, four point measurement was adopted to measure their resistance change. A current suppler (HY3005M-3 Digital Control) was used for the current input, and an oscilloscope (KEY- SIGHT DSO-X 2004A) was used for measuring the voltage. A constant current of 10 mA was applied on the temperature sensor, while three different current values (0.05 A, 0.1 A, 0.15 A) were applied on the flow sensor for characterization.

The temperature sensor was encapsulated with Kapton tape and soaked in water bath. The temperature of the water bath was controlled using a temperature controller (INKBIRD TECH.C.L).

Figure 4B:
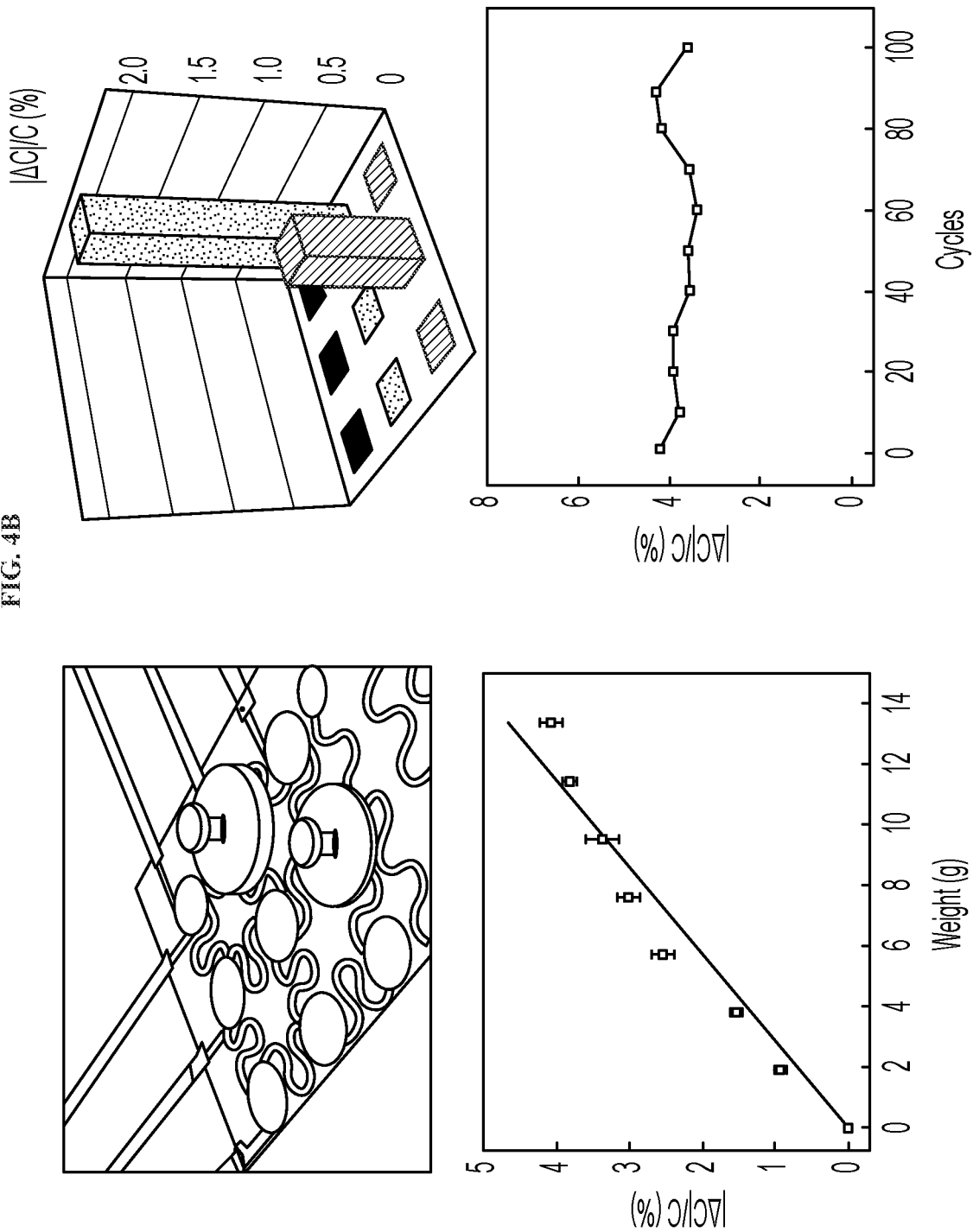
FIG. 4B is an images and set of graphs showing the characterization of the tactile sensor. When two different balance weights (2 g and 5 g) are put on top of the tactile sensor array (top left), both the weights and positions are detected (top right). The relative capacitance change of the tactile sensor versus weight shows linear relationship (bottom left). Repeatability of the tactile sensor is tested for 100 cycles with a 13.2 g weight (bottom right).

The flow sensor had the same design as the temperature sensor and was also encapsulated with Kapton tape. The integrated sensor was then inserted into a rubber tube of diameter 10 mm, as shown in FIG. 4E. A pump was used to supply water which flows throw the tube, and the speed was controlled using a valve. While the flow speed is calculated by measuring flow volume within one minute.

The humidity sensor was characterized within a chamber. The humidity was controlled by placing saturated solution of potassium acetate, magnesium nitrate, and sodium chloride at the bottom of the chamber. The solutions ensure the stabilized humidity within the chamber to be 21±2%, 40±2%, and 60±2%, respectively. The humidity values of 16±2% and 80±2% were controlled using calcium chloride and distilled water. Four point measurement was used for testing the resistance change.

The tactile sensor array was based on capacitance change between the two conductive element arrays separated by the dielectric polymer ring array. A capacitance meter for ultra-low capacitance measurement (Excelvan M6013) was used for the measurement of the capacitance change.

Example 1

E-Skin Design and Concepts

Figures 1B, 1C:
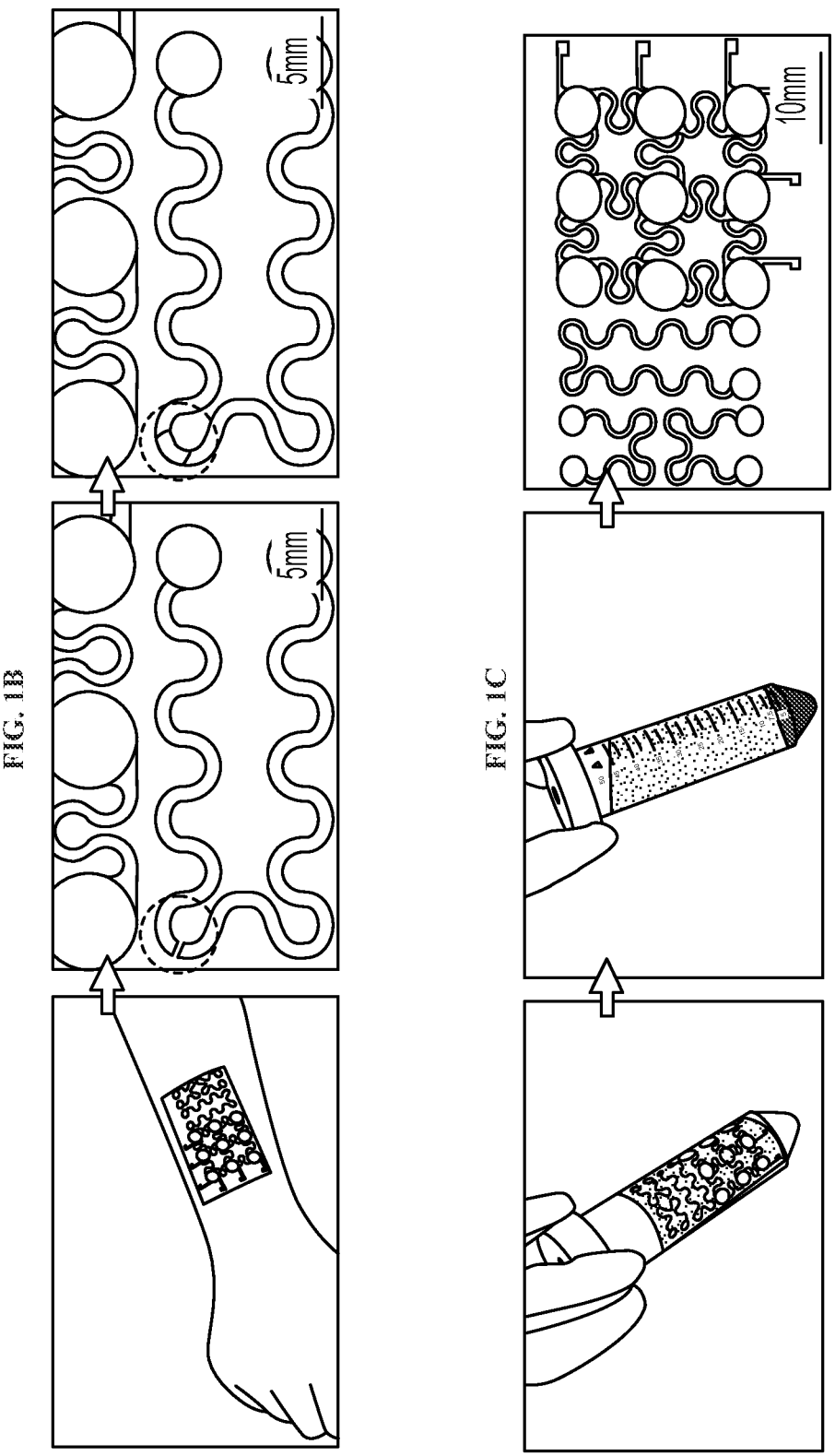

The rehealable and recyclable e-skin of the invention integrates tactile, flow, temperature, and humidity sensors, as shown conceptually in FIG. 1A. These sensors are fabricated using conductive polymers, obtained by doping dynamic covalent thermoset polyimine with silver nanoparticles (AgNPs). The sensors are then integrated onto a polyimine substrate by heat pressing, to ensure malleability, rehealability and full recyclability of the entire artificial skin. Covalent bonds are formed between the sensors and the substrate due to dynamic covalent bond exchange reactions at the interfaces. Serpentine interconnects are adopted to minimize the effects of strain on sensor performance when deformed. The e-skin can be easily conformed onto curved surfaces, e.g. human arms and robotic hands, by applying moderate heat and pressure (FIG. 1A, left). The geometrical conformity of the e-skin is permanent due to its malleability, even after the pressure or force is removed. When moderately damaged (FIG. 1A, top center), the e-skin can be rehealed (FIG. 1A, right). The rehealed e-skin can restore mechanical and electrical properties comparable to the original device. When severe damage occurs or the device is never needed, the whole e-skin can be fully recycled, leaving no waste at all. Once recycled, short oligomer/precursor solution and AgNPs are obtained (FIG. 1A, bottom center), and can be used for making new materials and devices (FIG. 1A, right). Optical images in FIG. 1B illustrate the rehealing processes of an e-skin. Due to the malleability provided by polyimine substrate, the e-skin can be conformally mounted onto a human arm (FIG. 1B, left). When a sensor is broken due to mechanical cutting (FIG. 1B, middle), it completely loses its functionality. By applying a small amount of rehealing agent (~23 mg of a solution of 1, 0.8 g, 5.96 mmol; 2, 0.184 g, 1.79 mmol; 3, 0.407 g, 2.78 mmol in 16 mL of ethanol) and heat pressing (8.5 kPa at 80° C.), the broken sensor is rehealed, regaining its full sensing capability and mechanical integrity (FIG. 1B, right). To recycle the e-skin, simply soaking the whole device into the recycling solution (FIG. 1C, left) will make the polymers degrade into oligomers and monomers that are soluble in ethanol (FIG. 1C, middle), and the AgNPs sink to the bottom of the solution (bottom dark part). The recycled solution and nanoparticles are then used to make a new, functional e-skin (FIG. 1C, right).

Example 2

Polyimine E-Skin Fabrication, Rehealing and Repair

Figure 2A:
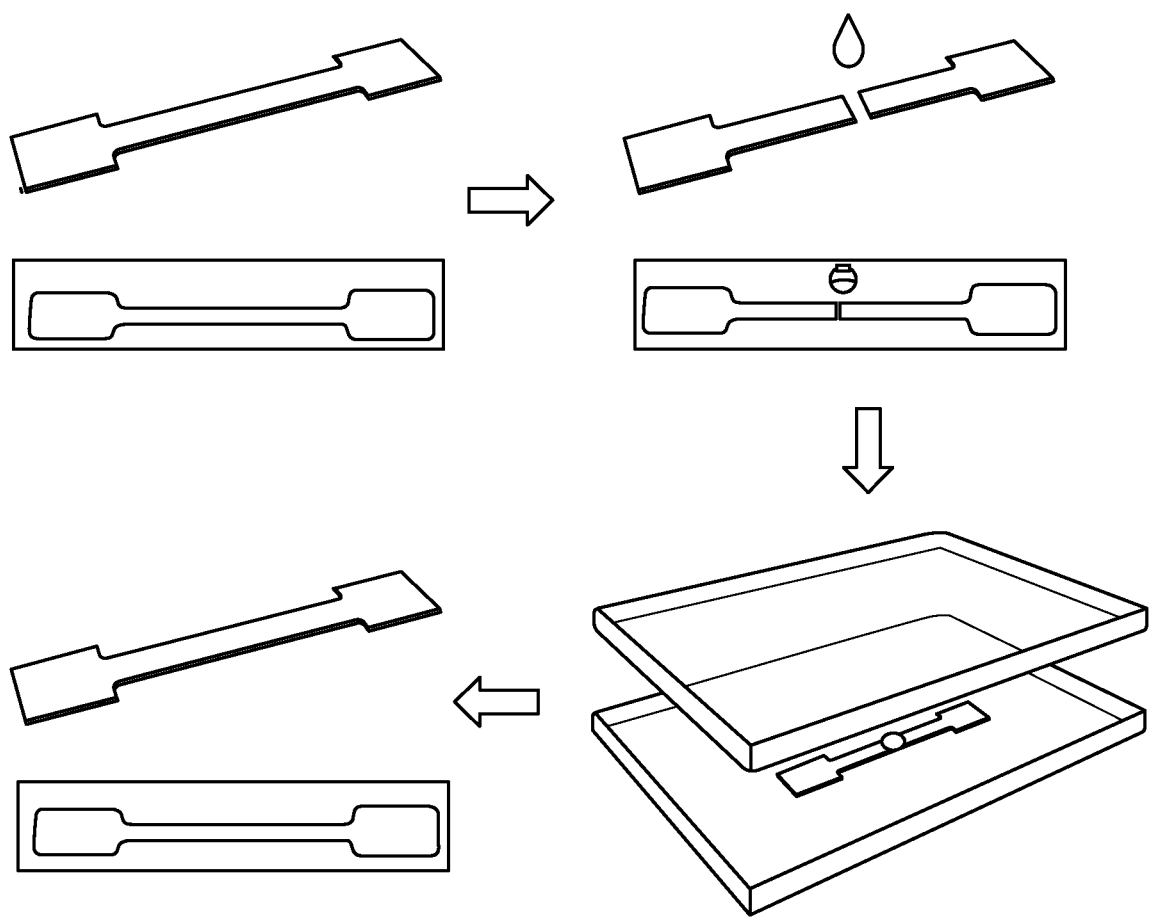

The detailed rehealing process of a pure polyimine polymer film is schematically illustrated in FIG. 2A, with optical images of the polyimine film shown at the bottom of each frame. A polyimine film was prepared by mixing three commercially available compounds: terephthalaldehyde (1), diethylenetriamine (2) and tris(2-aminoethyl)amine (3) in ethanol.

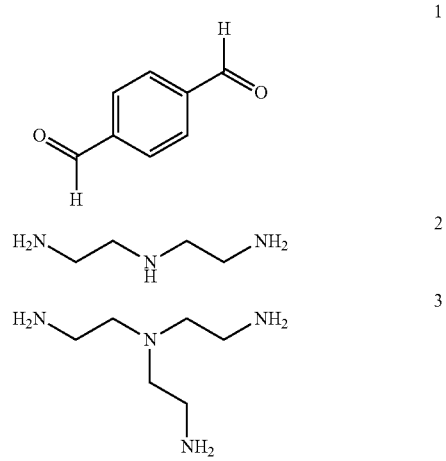

The polyimine film (FIG. 2A, top left) was cut along its width (FIG. 2A, top right). By applying a small amount of rehealing solution (compounds 1, 2, and 3 in ethanol) at the cut area and heat pressing (FIG. 2A, bottom right), the cut was rehealed (FIG. 2A, bottom left). During rehealing, the new oligomers/polymers grew across the broken surfaces. This eventually led to covalent (chemical) bonding of the two pieces, leaving no interfaces in the rehealed area, which mimics natural skin healing. This mechanism is different from traditional methods of bonding two material parts together, which rely on van der Waals (physical, non-covalent) interactions to form physical bonding at the interface. The interfaces remain after bonding, which can lead to significant degradation in mechanical properties, such as elastic modulus and tensile strength. FIG. 2B shows optical microscopy images of the cut at different stages of the rehealing process. The cut had a width of ~20 µm initially (FIG. 2B, top), and became invisible after healing, even under optical microscopy (FIG. 2B, middle and bottom). The conductive polyimine film, obtained by doping dynamic covalent thermoset polyimine with AgNPs at 33% weight ratio, was rehealed through the same process as shown in FIG. 2A, except that the rehealing agent consisted of compounds 1, 2, 3, and AgNPs in ethanol. The top frame of FIG. 2C shows an optical microscopy image of a cut of width ~20 µm in a conductive polyimine film. After applying rehealing agent and heat pressing, the cut was rehealed and became invisible (FIG. 2C, middle). Under optical microscopy, traces of the cut were seen, likely due to the presence of AgNPs partially inhibiting polymerization of the monomers/oligomers. Scanning electron microscopy (SEM) images of cross sections of the conductive polyimine before and after rehealing are shown in the top and middle frames of FIG. 2D, respectively. Good dispersion of AgNPs in the polymer network is shown in the magnified view (FIG. 2D, bottom).

Figure 2F:
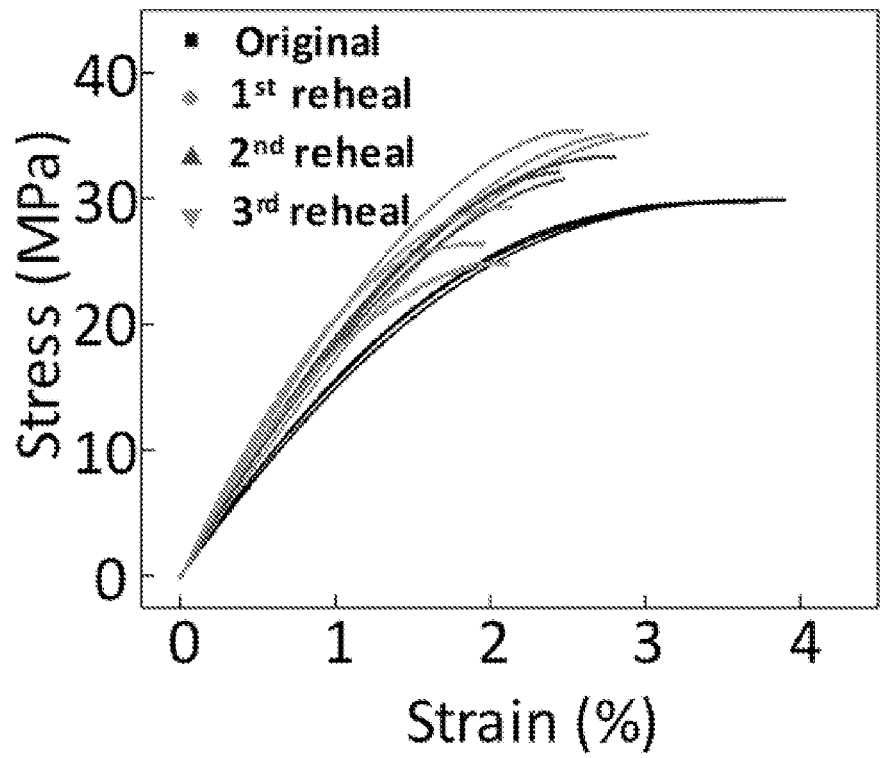
Figure 2G:
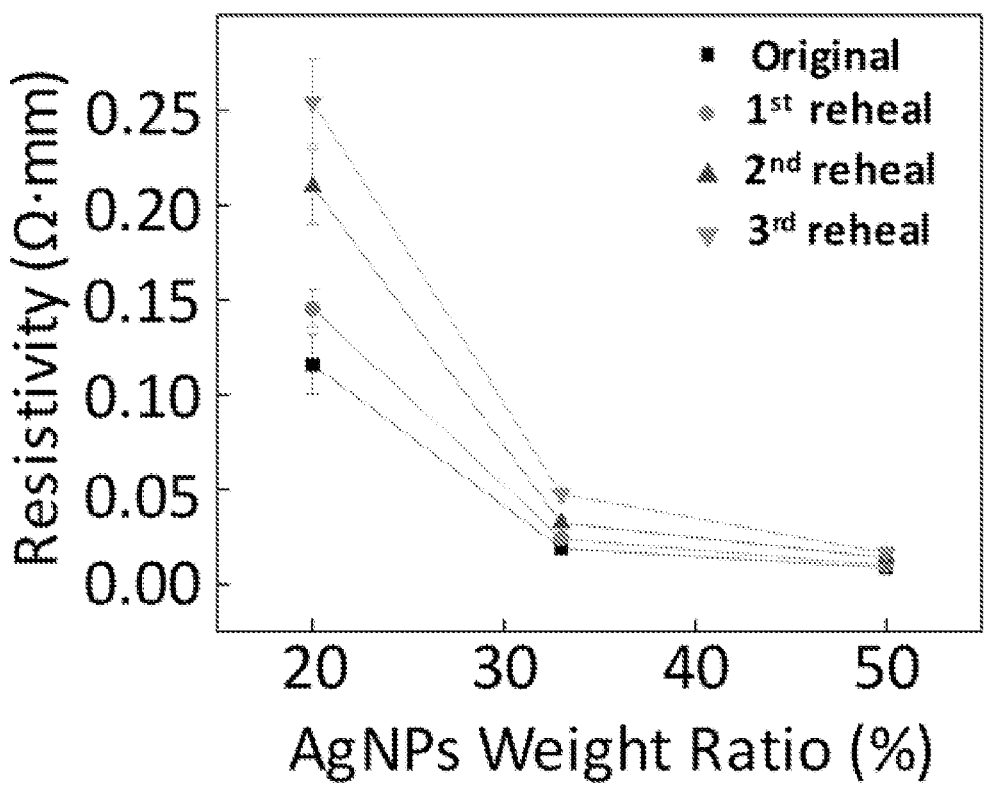

Uniaxial tension tests were conducted to compare the mechanical properties of pure and conductive polyimine films before and after rehealing. As shown in FIG. 2E, pure polyimine films restored their mechanical properties, such as elastic modulus, tensile strength and maximum tensile strain, even after three instances of rehealing. In addition, in each instance of breakage, the locations of failure of the rehealed films were different from the previous failure points, indicating that the previous breakages did not result in structural weaknesses. FIG. 2F presents the uniaxial tension test results of conductive polyimine films (33% AgNP weight ratio) before and after rehealing. The elastic modulus and tensile strength were retained or even slightly increased after each healing. The maximum tensile strain decreased by 23%, 26% and 44% after 1st, 2nd and 3rd rehealing, potentially due to complications caused by AgNPs at the interfacial bonding interactions, as well as the increased material brittleness caused by the repeated heat pressing treatments. Electrical resistivities of the conductive polyimine before and after rehealing were also investigated, for three different AgNP weight ratios (20%, 33% and 50%), as shown in FIG. 2G. After 1st, 2nd and 3rd rehealing, the electrical resistivity increased by 20%, 44%, 119% (25% AgNP weight ratio); 27%, 70%, 150% (33% AgNP weight ratio); and 13%, 59%, 88% (50% AgNP weight ratio), respectively.

Example 3

Polyimine E-Skin Recycling

Figure 3A:
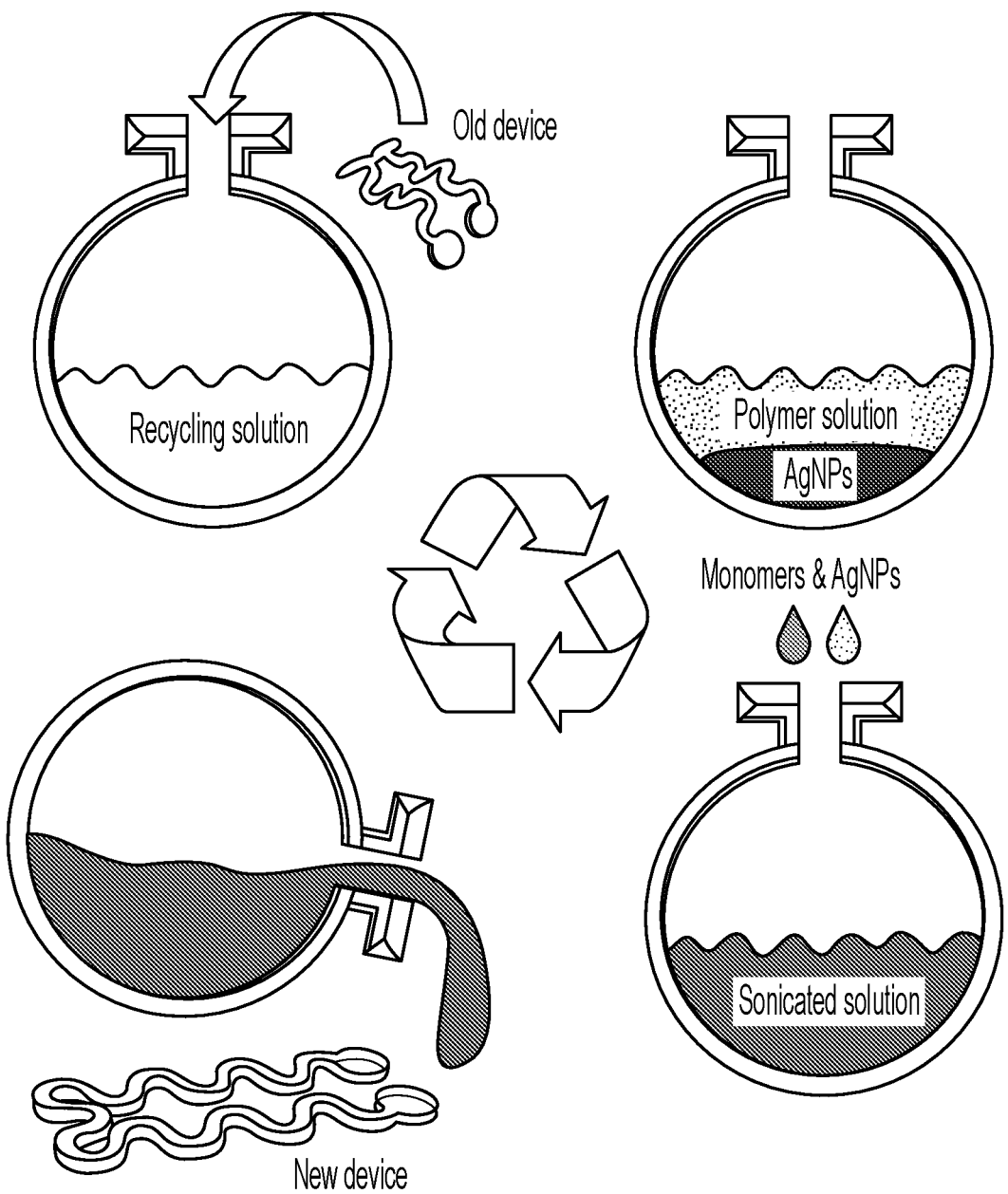
FIGS. 3A-3E are images and graphs showing the recycling and characterization of the pure and conductive polyimine films of the invention.
Figure 3B:
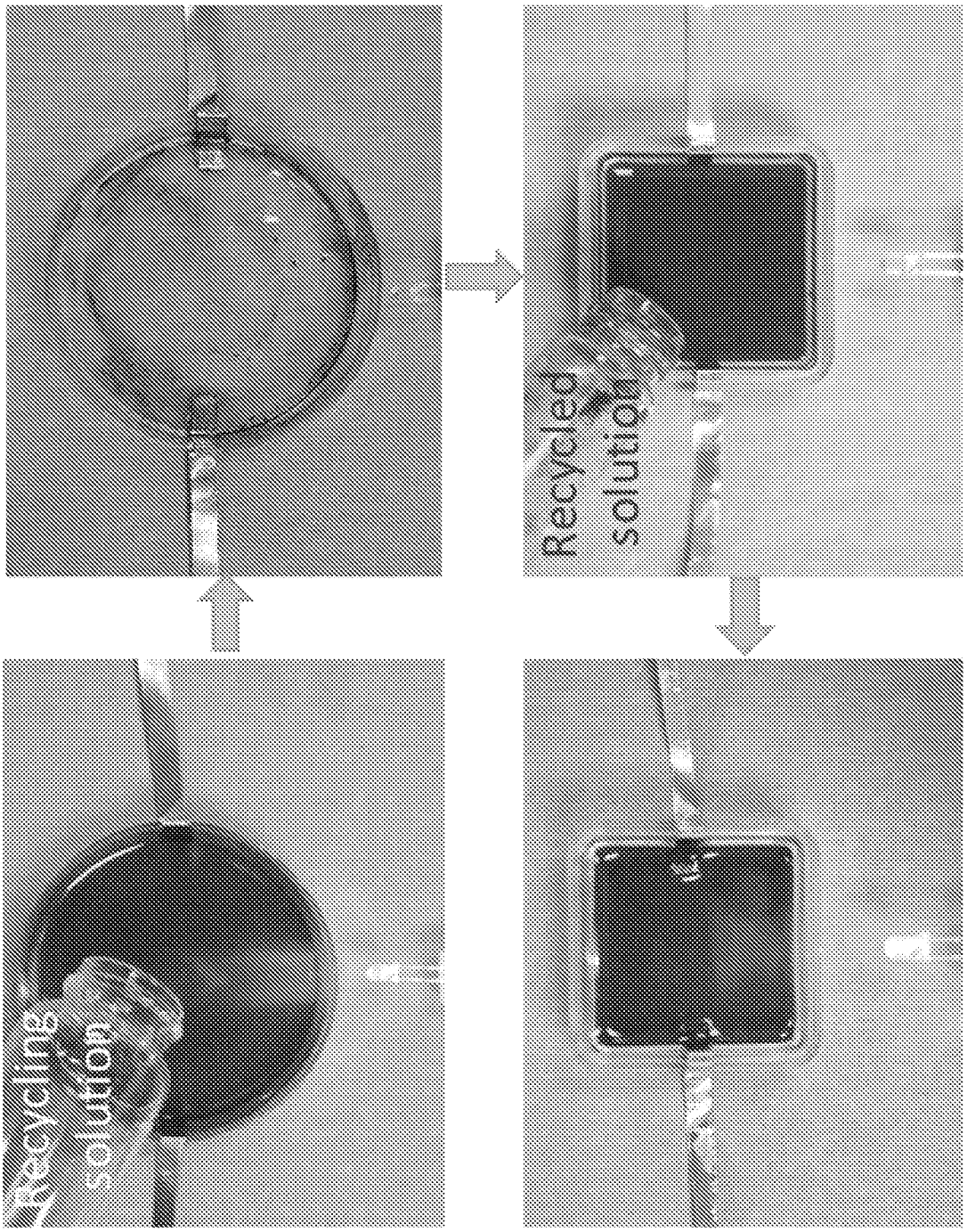

The stoichiometric balance among aldehyde and amine groups within the polyimine network can be upset by the introduction of an excess of free primary amine groups (e.g. excess diamine monomer). Transimination reactions among the excess diamine monomers and the imine-linked network can lead to increased end groups within the matrix, thus reducing the molecular weight and solubilizing the network. Such a depolymerization mechanism enables efficient recycling of the device consisting of dynamic covalent polyimine matrix and AgNPs. FIG. 3A schematically illustrates the recycling process of a recyclable device comprising a polyimine film with 33% AgNP (by weight). A device was soaked in the recycling solution (ethanol, 2, 0.046 g, 0.448 mmol and 3, 0.102 g, 0.685 mmol) (FIG. 3A, top left), which decomposed the polymer into oligomers/monomers and AgNPs. The oligomers/monomers were soluble in the solution, and AgNPs sank to the bottom (FIG. 3A, top right). After recycling, the solution and AgNPs were either separated for later use or mixed together to make new materials or devices. To completely reuse the recycled solution and AgNPs to fabricate new devices, compounds 1 and 3, and additional AgNPs were added proportionally and mixed (FIG. 3A, bottom right). After polymerization, the conductive polyimine was used to fabricate new devices (FIG. 3A, bottom left). FIG. 3B demonstrates the recycling of a conductive polyimine film. The LED light turned on when the conductive polymer was integrated into a simple lighting circuit (FIG. 3B, top left). The recycling solution was then poured into the petri dish containing the polyimine film, causing decomposition and solvation of the polymer. After the polymer was fully dissolved, the LED light turned off due to this break in the circuit (FIG. 3B, top right). Subsequently, the solution and AgNPs were transferred out of the original circular petri dish, and poured into a different, square petri dish (FIG. 3B, bottom right). An amount of terephthalaldehyde (1, 0.2 g, 1.49 mmol) was added to the solution in order to re-polymerize the material. Upon polymerization, the resulting film became conductive again, completing the circuit, demonstrated by the lit up LED (FIG. 3B, bottom left). The recycling processes was completed within 6 hours at room temperature without sonication or within 2 hours with sonication, demonstrating that the recycling process is economical and eco-friendly (100% recyclable and reusable).

Figure 3C:
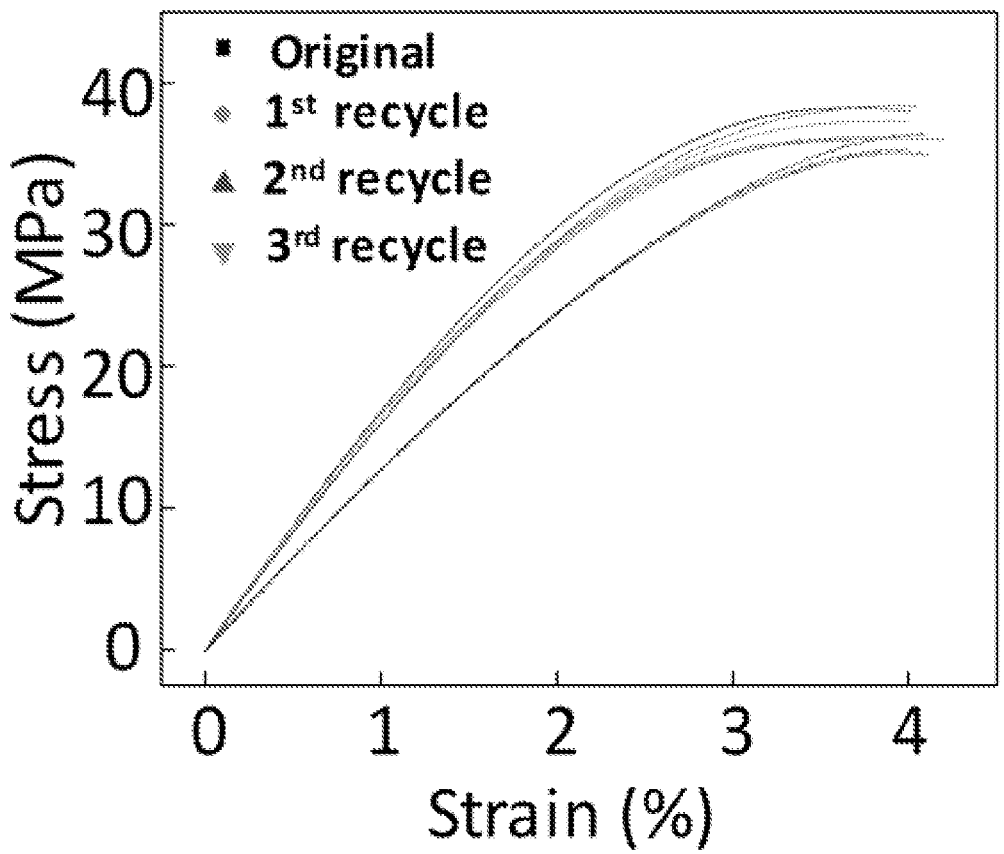
Figure 3D:
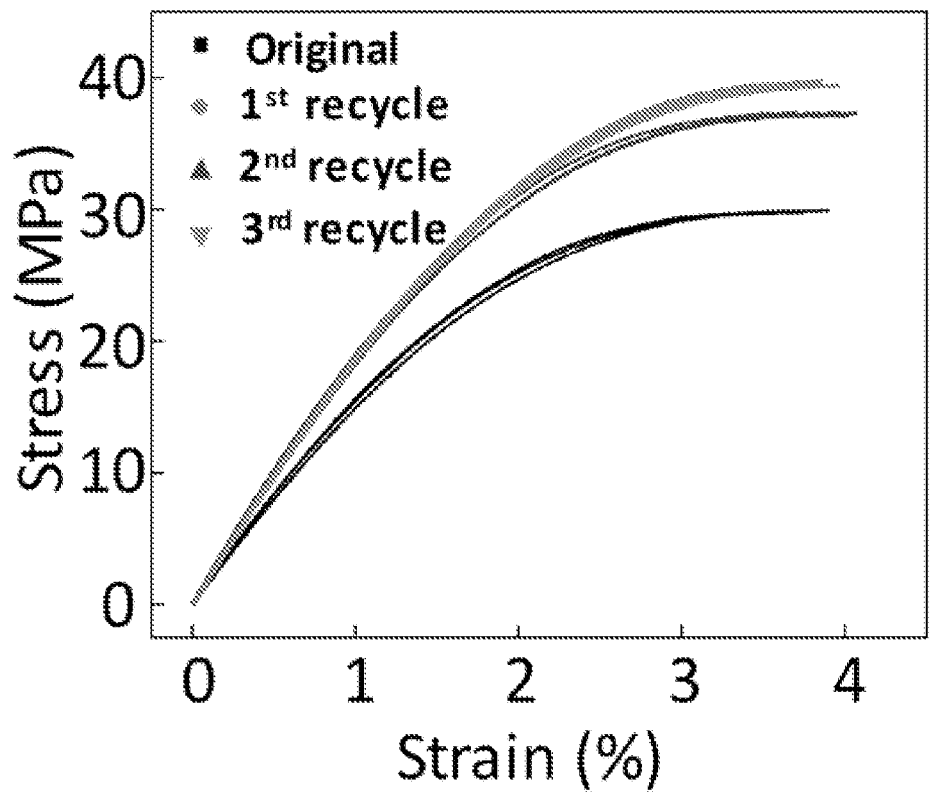
Figure 3E:
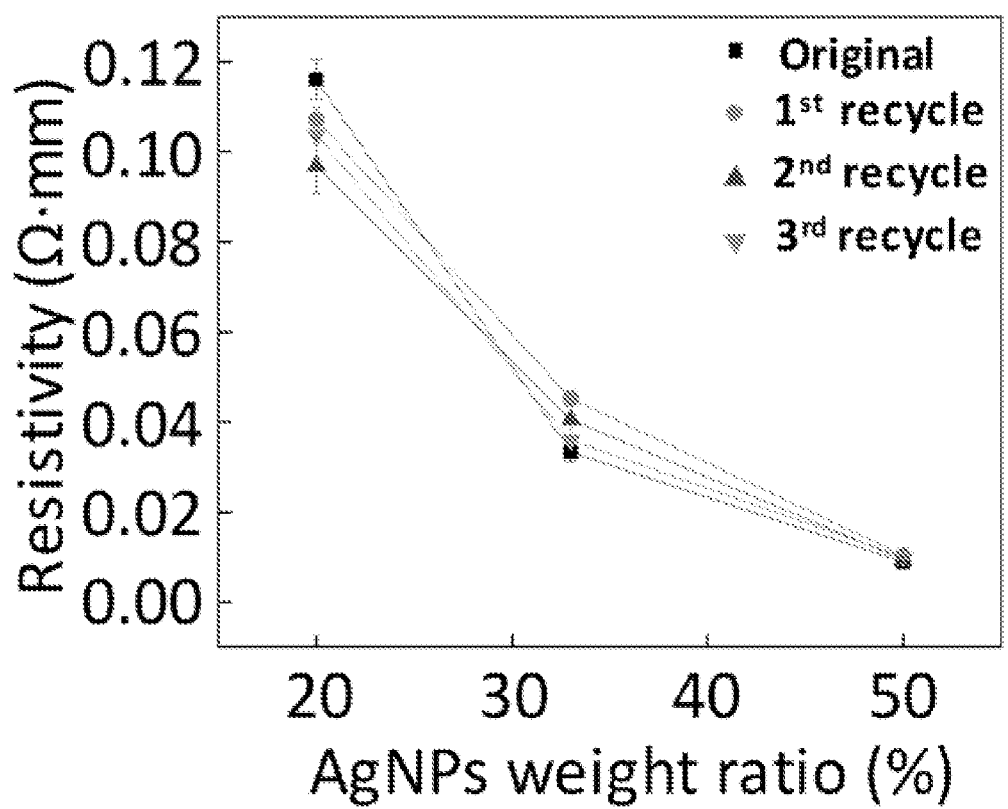

The stress-strain curves of pure polyimine films before and after up to three times recycling were compared, as shown in FIG. 3C. The Young's moduli and tensile strengths of the recycled films increased by 20% and 26%, respectively, compared with the original films. Without wishing to be limited to any particular theory, this could be due to an increase in crosslinking density when using recycled oligomers as the starting materials instead of small molecule monomers. FIG. 3D compares stress-strain curves for conductive polyimine films before and after recycling. Similar increases in both Young's modulus and tensile strength were observed. Electrical resistivities of conductive polyimine films with 20%, 33% and 50% AgNP weight ratios before and after recycling were measured. Recycling did not produce a noticeable effect on the electrical resistivity of the conductive polyimine films (FIG. 3E).

Example 4

Polyimine E-Skin Sensor Integration and Testing

The conductive polyimine films were used to fabricate tactile, flow, temperature, and humidity sensors, which were then integrated onto a polyimine substrate to realize malleable, rehealable and fully recyclable e-skin. Briefly, a mixture of diethylenetriamine monomer (2, 0.046 g, 0.448 mmol) and tris(2-aminoethyl)amine (3, 0.102 g, 0.685 mmol) was added to a 5 mL screw cap vial followed by addition of ethanol (4 mL). Silver nanoparticles (Purchased from SIGMA ALDRICH, particle size~100 nm) in different weight percentages (20% wt 0.087 g, 33% wt 0.174 g, 50% wt 0.348 g) were added into the vial and sonicated for 2 hours, then terephthalaldehyde (1, 0.2 g, 1.49 mmol) was added into the vial and the resulting mixture was fully mixed. The mixed solution was then poured into a petri dish coated with PDMS. The solution was allowed to evaporate in a fume hood overnight at room temperature. The design and an optical image of the e-skin is illustrated in FIG. 4A. Serpentine structures were adopted to minimize the influence of strains on the performance of sensors. The tactile sensing was based on the capacitance change between the two conductive element arrays (top and bottom element arrays in FIG. 4A) separated by the dielectric polymer ring array (middle array in FIG. 4A). FIG. 4B shows the performance of the tactile sensor. When two different balance weights (2 g and 5 g) are placed on the tactile sensor array (top left), both the weights and positions are detected by the sensor (top right). The relative capacitance change versus weight shows linear relationship (bottom left). Loading and unloading of a 13.2 g weight is also tested for 100 times to ensure repeatability (bottom right).

Figure 4C:
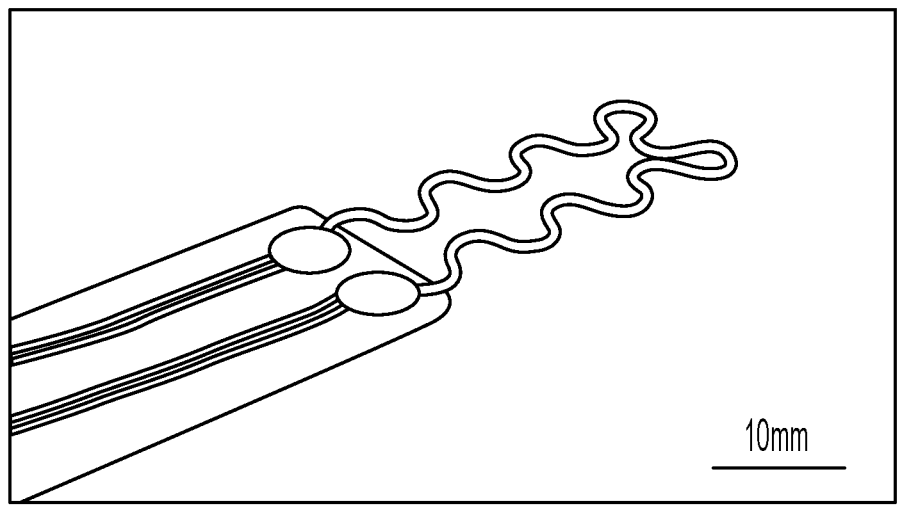
FIGS. 4C-4E are optical images of a humidity sensor (FIG. 4C) and a flow/temperature sensor (FIGS. 4D-4E) of the invention.
Figure 4D:
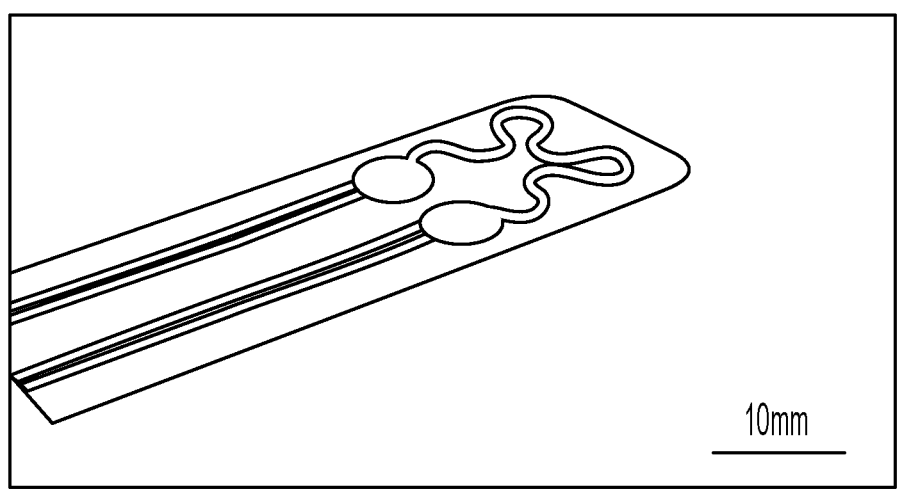
Figure 4E:
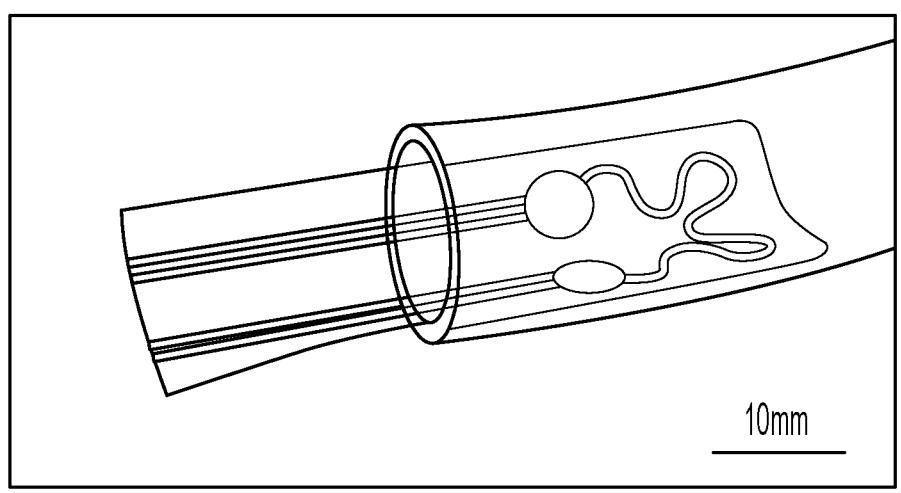
Figure 4G:
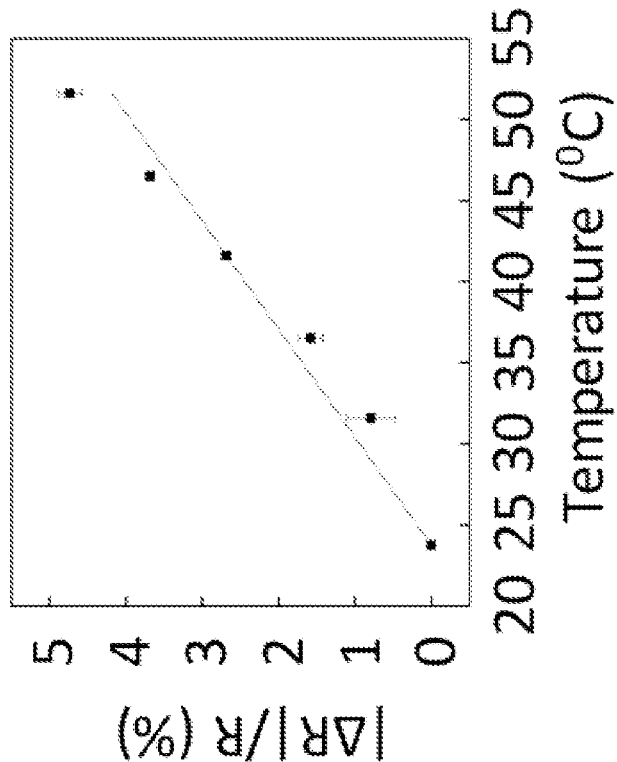
FIGS. 4F-4H are graphs showing the characterization of the flow sensor with different current (FIG. 4F), temperature sensor (FIG. 4G), and humidity sensor (FIG. 4H).
Figure 4F:
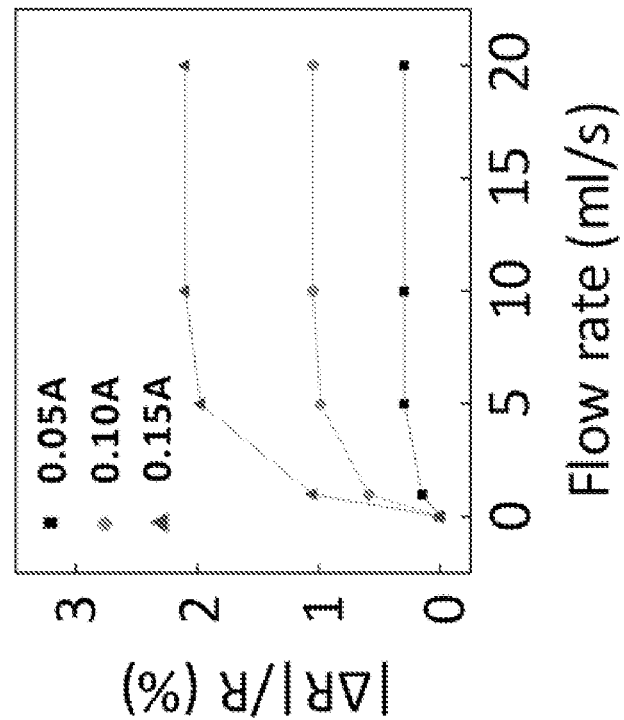
Figure 4H:
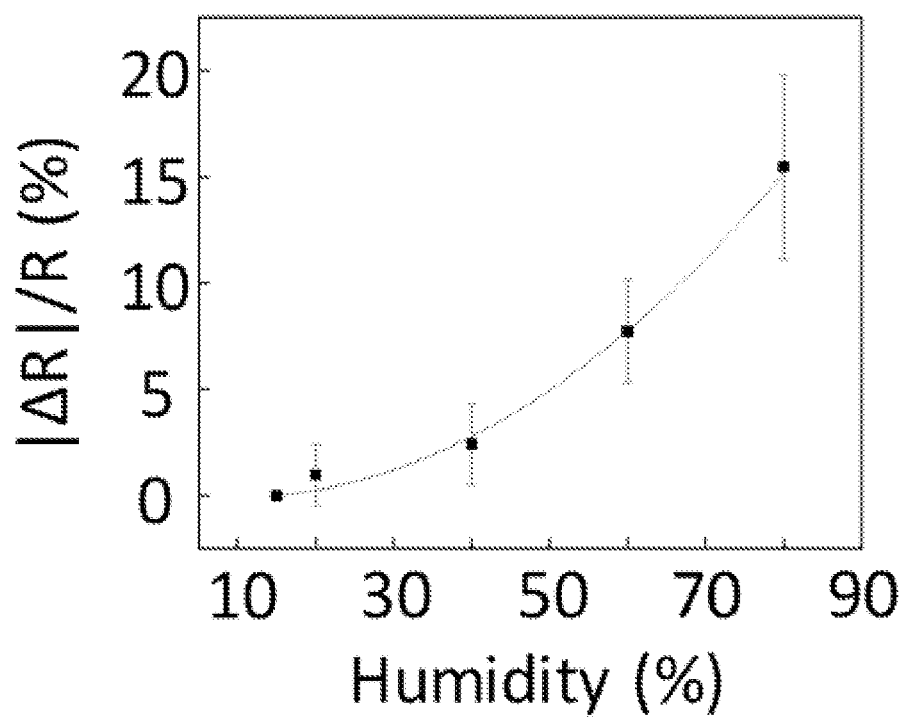

FIGS. 4C-4E are images of humidity (FIG. 4C) and flow/temperature sensors (FIGS. 4D-4E) fabricated according to the designs shown in FIG. 4A. FIG. 4F exhibits the measured relative resistance change in the flow sensor versus flow rate at different currents. The measurement was conducted by controlling the water flow in a tube of diameter 10 mm, and the flow sensor was attached on the inner wall of the tube. As shown in FIG. 4F, the flow sensor can sense flow rates lower than 10 ml/s, beyond which the flow sensor doesn't change its resistance with increasing flow rate any more. And as expected, increasing current can effectively enhance the sensitivity. Characterizations of the temperature sensor is presented in FIG. 4G. The sensor resistance changes linearly with temperature between 24° C. and 54° C. The humidity sensor can sense humidity based on the plasticizing effect of water on the polyimine. As water molecules diffuse into the sensor, the polymer network expands, leading to increase of the sensor resistance. FIG. 4H presents the measured relative resistance change of the humidity sensor versus humidity between 16% and 77%, which shows quadratic dependency.

Figure 4J:
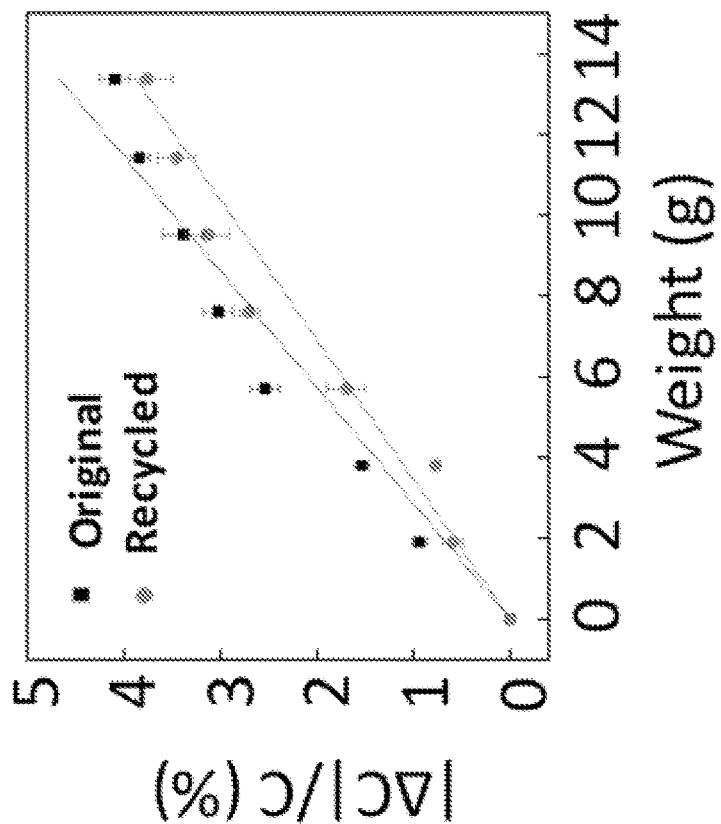
FIG. 4J is a graph comparing sensing properties of the tactile sensor before and after recycling.
Figure 4I:
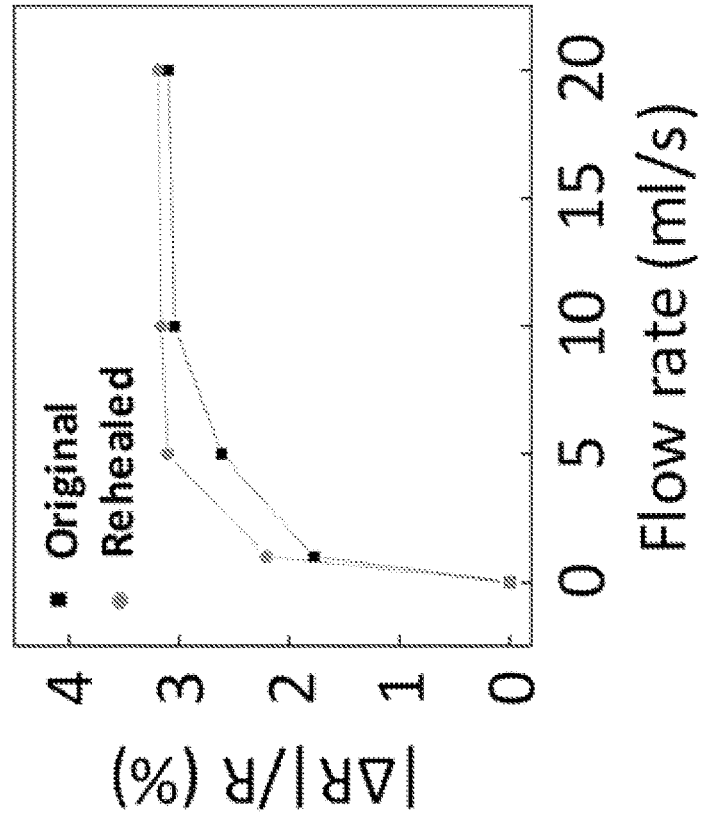
FIG. 4I is a graph comparing sensing properties of the flow sensor before and after rehealing.

To demonstrate rehealing capability of the e-skin, the flow sensor is cut broken, and then rehealed using the process described previously. As shown in FIG. 4I, the rehealed flow sensor regains its flow sensing capability, which is comparable to the original sensor before cutting. Recycling of the tactile sensor is also demonstrated. FIG. 4J compares the sensing characteristics of the tactile sensor in its original form, and after recycled. The recycled tactile sensor shows similar sensing performance compared with the original tactile sensor. The slight reduction in sensitivity is probably due to the slight increase in Young's modulus of the recycled conductive polyimine film, as shown in FIG. 3D.

Figure 4K:
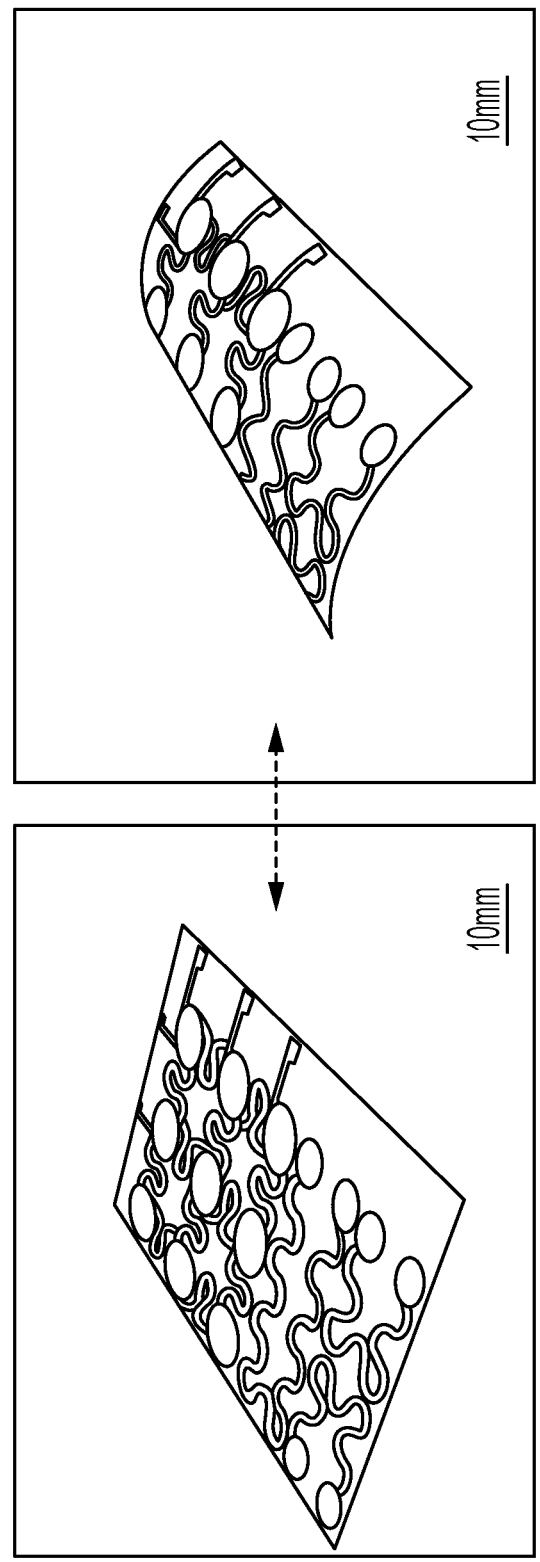
FIG. 4K is a schematic showing that malleability enables the e-skin to change its shape between flat (left) and bent (right) states.
Figure 4L:
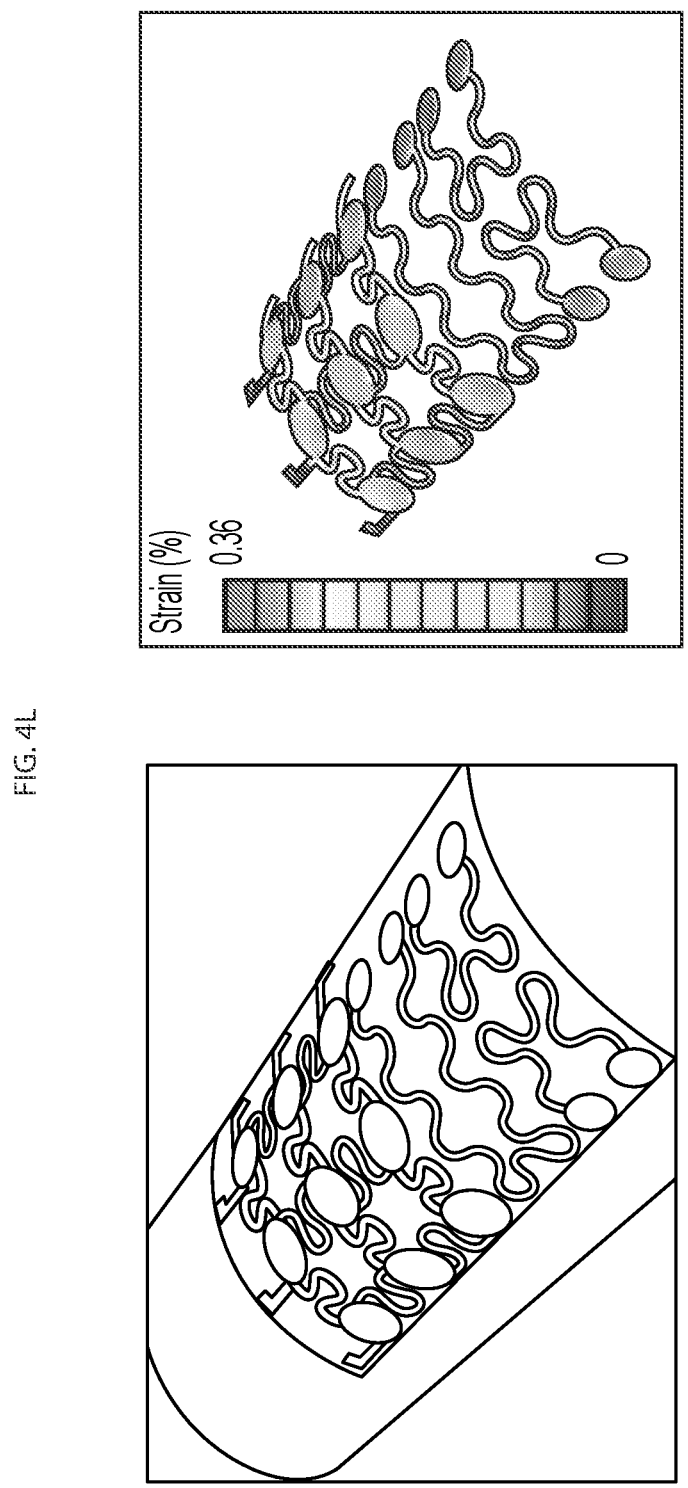
FIG. 4L is a schematic experimental image (top) and finite element analysis (FEA) results (bottom) of the e-skin bended around a cylinder of radius 100 mm.
Figure 4N:
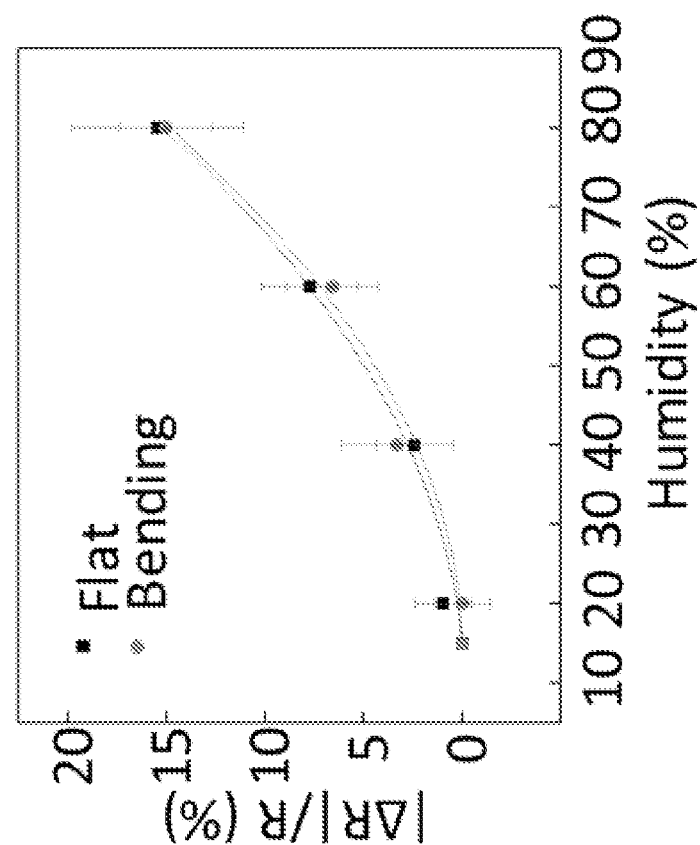
Figure 4M:
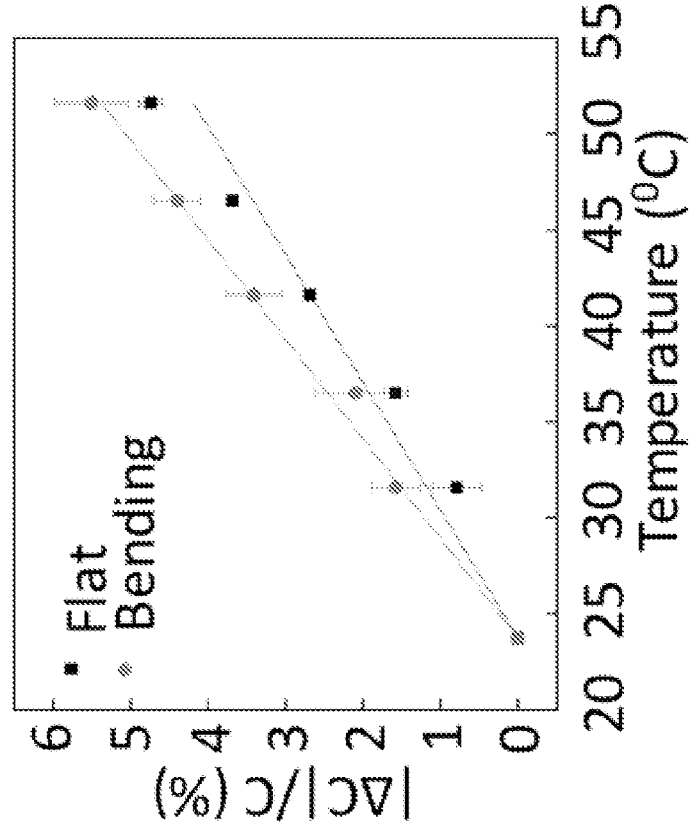
Figure 4O:
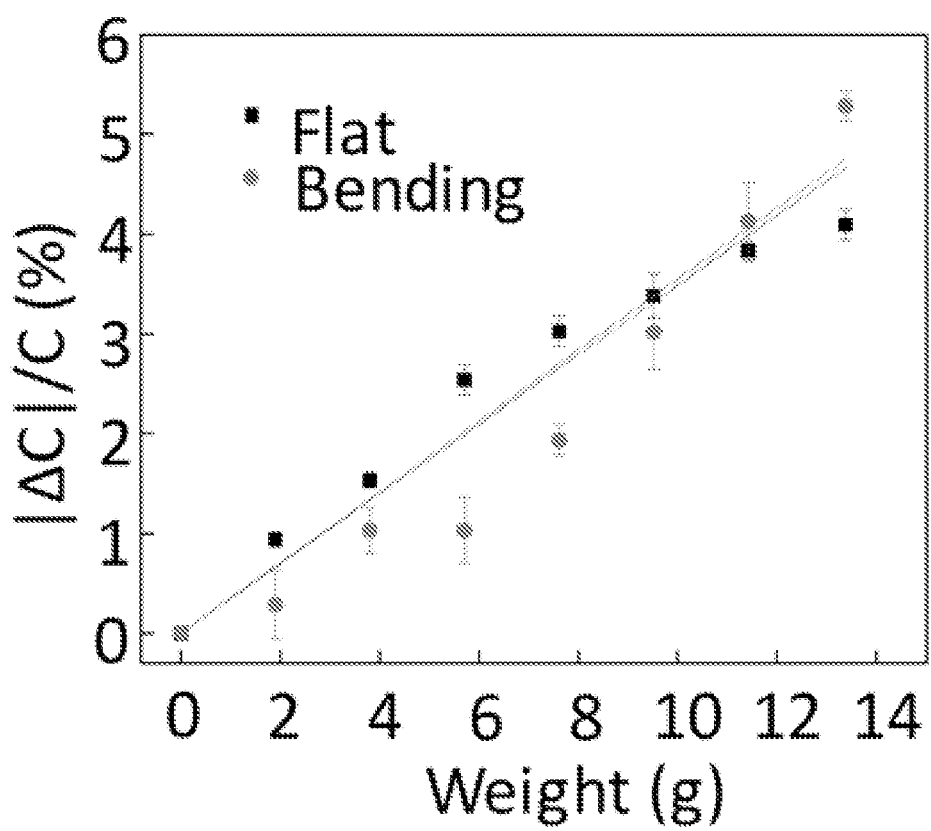

The e-skin is not only rehealable and recyclable, but also flexible and malleable. By applying moderate heat (60° C.), the flat e-skin (FIG. 4K, left) can be deformed into a curved shape. After cooling down and removing the applied force, the e-skin stays at its deformed, curved shape (FIG. 4K, right). This process is reversible and repeatable. Such property renders the e-skin excellent capability in matching with complex geometries, without incurring high stress buildup at the interface. FIG. 4L shows the e-skin is bended around a cylinder of radius 100 mm. Finite element simulation results give the strain distribution in the deformed e-skin. The maximum strain in the deformed e-skin is 0.36%, much smaller than the failure strain of the conductive polyimine. The properties of the sensors under bending are also investigated. FIGS. 4M-4O present the sensing properties of the temperature, humidity and tactile sensors when they are bent to a diameter of 100 mm, which show comparable behavior to these sensors in their flat states.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. An electrically conductive dynamic covalent network polymer composition comprising:
    at least one dynamic covalent network polymer comprising at least one multifunctional amine monomer and at least one multifunctional aldehyde monomer, or a Schiff base reaction product thereof,
    at least one electrically conductive particle comprising at least one of a liquid metal particle, a metal oxide particle, a metalloid particle, a graphene particle, a graphite particle, a carbon nanowire, or a metal particle,
    wherein the at least one multifunctional amine monomer is at least one compound selected from the group consisting of a compound of Formula (I), a compound Formula (I), and a salt or solvate thereof:

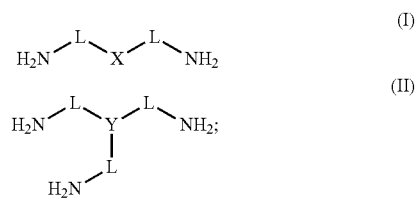

wherein the at least one multifunctional aldehyde monomer is at least one compound selected from the group consisting of a compound of Formula (III), a compound Formula (IV), and a salt or solvate thereof:

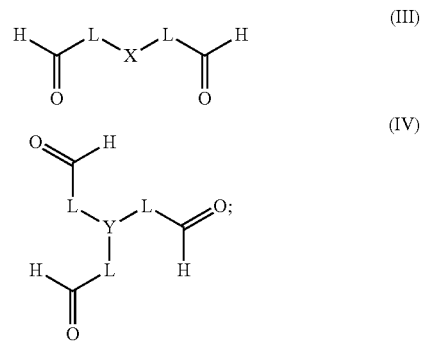

wherein:
    each instance of L is independently selected from the group consisting of optionally substituted $C_1$-$C_{15}$ alkylene, optionally substituted $C_2$-$C_{15}$ alkenylene, optionally substituted $C_2$-$C_{15}$ alkynylene, optionally substituted $C_2$-$C_{15}$ heteroalkylene, optionally substituted $C_2$-$C_{15}$ heteroalkenylene, optionally substituted $C_2$-$C_{15}$ heteroalkynylene, optionally substituted aromatic, optionally substituted heteroaromatic, and a bond:
    each X is independently at each occurrence selected from the group consisting of phenylene, $CH_2$, and NH;
    each Y is independently at each occurrence selected from the group consisting of tri-substituted phenyl, CH, and N, and
wherein the metal in the metal particle is selected from the group consisting of silver, copper, gold, and nickel.

2. The composition of claim 1, wherein the at least one electrically conductive particle is selected from the group consisting carbon nanowires, graphite nanoparticles, graphene nanoplatelets, silver nanoparticles, silver nanowires, copper nanoparticles, gold nanoparticles, nickel nanoparticles, boron nanoparticles, and antimony tin oxide nanoparticles.

3. The composition of claim 1,
wherein the compound of formula (I) is

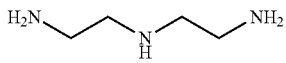

diethylenetriamine, or
wherein the compound of formula (II) is

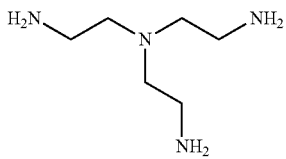

tris(2-aminoethyl)amine.

4. The composition of claim 1, wherein the at least one multifunctional aldehyde monomer is at least one compound selected from the group consisting a compound of Formula (IIIa), a compound Formula (IVa), and a salt or solvate thereof:

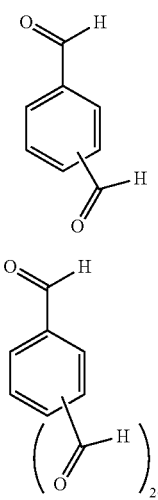

5. The composition of claim 1, comprising a dynamic covalent network polymer formed from terephthalaldehyde, diethylenetriamine and tris(2-aminoethyl)amine monomers, and silver nanoparticles.

6. The composition of claim 5, wherein the composition comprises about 150 to about 60% silver nanoparticles by weight.

7. The composition of claim 1, wherein the composition has a resistance of about 25Ω to about 1Ω.

8. An electronic skin mimic device comprising at least one electrically conductive dynamic covalent network polymer composition of claim 1 and at least one non-conductive polymer substrate.

9. The device of claim 8, wherein the at least one non-conductive polymer substrate comprises a non-conductive dynamic covalent network polymer comprising at least one exchangeable dynamic covalent linkage selected from the group consisting of a disulfide linkage, an imine linkage, a thioester linkage, an acyl hydrazine linkage, a boronic ester linkage, an alkene linkage, an alkyne linkage, an ester linkage, a carbamate linkage and a urea linkage.

10. The device of claim 8, wherein the at least one layer of electrically conductive dynamic covalent network polymer composition has a thickness of about 1 m to about 1 mm.

11. The device of claim 8, wherein the at least one layer of non-conductive polymer substrate has a thickness of about 0.1 m to about 1 mm.

12. The device of claim 8, wherein the device comprises at least one layer of electrically conductive dynamic covalent network polymer composition disposed on the surface of at least one layer of non-conductive polymer substrate.

13. The device of claim 8, wherein the device comprises at least one serpentine shaped layer of electrically conductive dynamic covalent network polymer composition disposed on the surface of at least one layer of non-conductive polymer substrate.

14. The device of claim 8, wherein the device comprises a sensor.

15. The device of claim 14, wherein the device comprises at least one the following:
   a sensor capable of detecting or quantifying at least one stimulus selected from the group consisting temperature, fluid flow rate, humidity, air pressure, tactile pressure, force, strain and magnetic field;
   an array of tactile pressure sensors adapted and configured to distinguish surface textures and shapes.

16. The device of claim 14, wherein the device comprises a tactile pressure sensor comprising three layers:
   a first serpentine electrically conductive dynamic covalent network polymer layer array disposed on the surface of the non-conductive polymer substrate,
   a non-conductive dynamic covalent network polymer layer array of dielectric rings disposed on the first serpentine electrically conductive dynamic covalent network polymer layer array; and
   a second serpentine electrically conductive dynamic covalent network polymer layer array disposed on the surface of the non-conductive dynamic covalent network polymer layer array of dielectric rings,
   such that the first electrically conductive array is oriented at a 900 angle in relation to the second electrically conductive array.

17. The device of claim 16, wherein the non-conductive dynamic covalent network polymer layer array of dielectric rings has a thickness of about 0.1 μm to about 1 mm.

* * * * *